US012634091B2

(12) United States Patent
Hao et al.

(10) Patent No.: US 12,634,091 B2
(45) Date of Patent: May 19, 2026

(54) UNIFIED CHANNEL STATE INFORMATION FRAMEWORK FOR SIDELINK COMMUNICATIONS

(71) Applicant: QUALCOMM Incorporated, San Diego, CA (US)

(72) Inventors: Chenxi Hao, Beijing (CN); Chao Wei, Beijing (CN); Hui Guo, Beijing (CN); Yu Zhang, San Diego, CA (US); Hao Xu, Beijing (CN); Min Huang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 18/256,625

(22) PCT Filed: Feb. 19, 2021

(86) PCT No.: PCT/CN2021/076855
§ 371 (c)(1),
(2) Date: Jun. 8, 2023

(87) PCT Pub. No.: WO2022/174388
PCT Pub. Date: Aug. 25, 2022

(65) Prior Publication Data
US 2024/0031109 A1      Jan. 25, 2024

(51) Int. Cl.
*H04L 5/00*      (2006.01)
*H04B 7/06*      (2006.01)
*H04W 76/14*      (2018.01)

(52) U.S. Cl.
CPC ......... *H04L 5/0057* (2013.01); *H04B 7/0626* (2013.01); *H04B 7/0639* (2013.01); *H04L 5/0048* (2013.01); *H04W 76/14* (2018.02)

(58) Field of Classification Search
None
See application file for complete search history.

(56) References Cited

U.S. PATENT DOCUMENTS

| | | | | |
|---|---|---|---|---|
| 2016/0157258 A1* | 6/2016 | Saiwai | ................... | H04W 72/21 |
| | | | | 370/329 |
| 2017/0034842 A1* | 2/2017 | Xu | ......................... | H04W 64/00 |
| (Continued) | | | | |

FOREIGN PATENT DOCUMENTS

| | | | |
|---|---|---|---|
| CN | 110677880 A | 1/2020 |
| WO | WO-2020200079 A1 | 10/2020 |
| WO | WO-2020222443 A1 | 11/2020 |

OTHER PUBLICATIONS

Author Unknown, PHY layer procedures for NR sidelink, Doc No. R1-1910538, pp. 1-15, Oct. 14, 2019.*
(Continued)

*Primary Examiner* — Christopher M Crutchfield
(74) *Attorney, Agent, or Firm* — Holland & Hart LLP/Qualcomm

(57) ABSTRACT

Methods, systems, and devices for wireless communications are described. A first user equipment (UE) may transmit a trigger message to a second UE, where the trigger message triggers a channel state information (CSI) report that includes a first CSI reporting mode of a set of CSI reporting modes and a reporting quantity for the first CSI reporting mode. For a first reporting quantity, the first UE may trigger the second UE to transmit a CSI reference signal (RS), and the first UE may then receive the CSI-RS to determine CSI based on the CSI-RS. Additionally or alternatively, for other reporting quantities, the first UE may transmit the CSI-RS to the second UE, and the second UE may transmit channel state feedback to the first UE based on measuring CSI for the
(Continued)

received CSI-RS, where the first UE determines the CSI based on the channel state feedback.

28 Claims, 20 Drawing Sheets

(56)                    References Cited

U.S. PATENT DOCUMENTS

| | | | |
|---|---|---|---|
| 2021/0051681 A1 | 2/2021 | Manolakos et al. | |
| 2021/0136731 A1* | 5/2021 | Li | H04W 28/06 |
| 2021/0136742 A1* | 5/2021 | Huang | H04L 1/1822 |
| 2021/0274578 A1* | 9/2021 | Yum | H04L 1/0026 |
| 2022/0167312 A1* | 5/2022 | Lee | H04L 5/0055 |
| 2023/0095061 A1* | 3/2023 | Son | H04W 72/20 |
| | | | 370/252 |

OTHER PUBLICATIONS

Fujitsu: "Dual-Mode Configuration and Selection Mechanism for NR Sidelink", 3GPP TSG RAN WG2 Meeting #113-e, R2-2100423, e-Meeting, Jan. 25-Feb. 5, 2021, the Whole Document, pp. 1-5.
International Search Report and Written Opinion—PCT/CN2021/076855—ISA/EPO—Nov. 19, 2021.

* cited by examiner

305

310

300

315

301

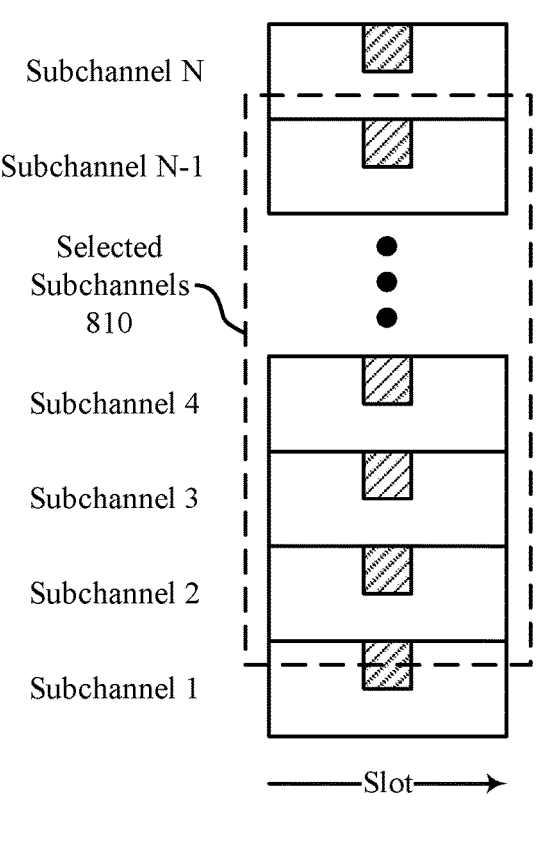
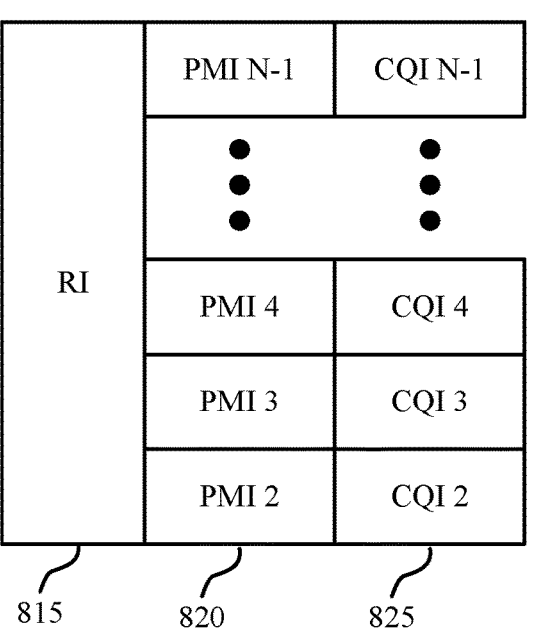
FIG. 8

905

SCI-1

SCI-2
(CSI-1)

CSI-2 + Data
or
CSI-2

Gap

910

915

920

900

Identify a CSI report configuration that indicates a first CSI reporting mode of a set of multiple different modes for a CSI procedure ⟍ 1505

Transmit, to a second UE, a trigger message triggering a CSI report corresponding to the CSI report configuration ⟍ 1510

Transmit to or receive from the second UE a CSI-RS in accordance with the first CSI reporting mode ⟍ 1515

1500

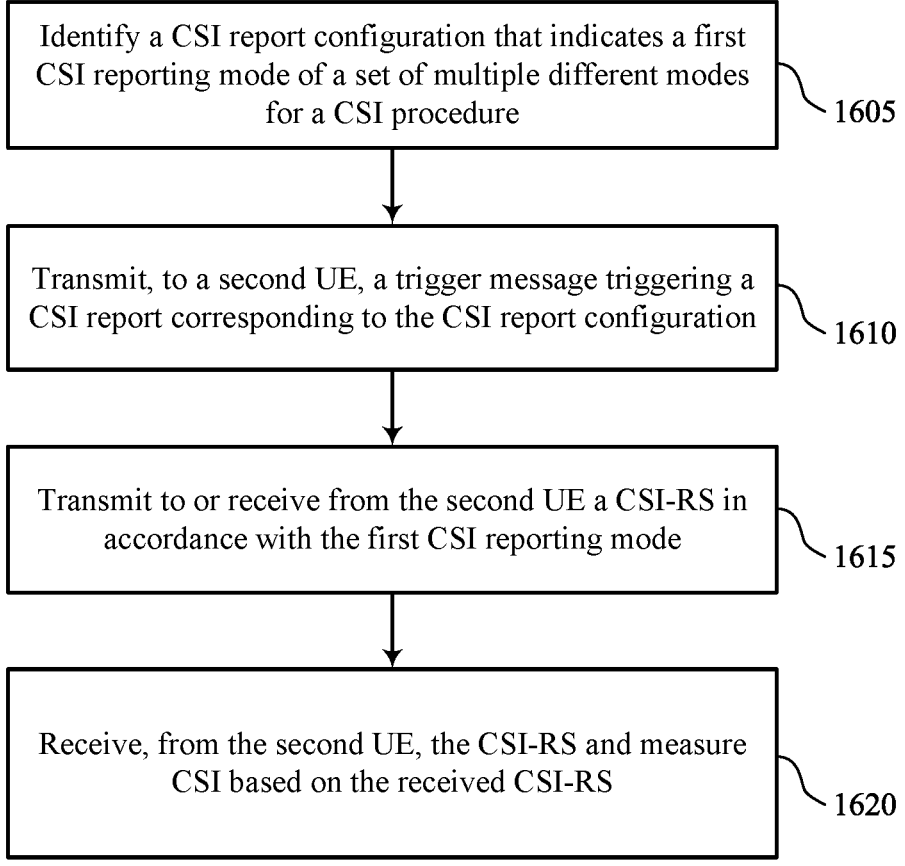

Identify a CSI report configuration that indicates a first CSI reporting mode of a set of multiple different modes for a CSI procedure

1605

Transmit, to a second UE, a trigger message triggering a CSI report corresponding to the CSI report configuration

1610

Transmit to or receive from the second UE a CSI-RS in accordance with the first CSI reporting mode

1615

Receive, from the second UE, the CSI-RS and measure CSI based on the received CSI-RS

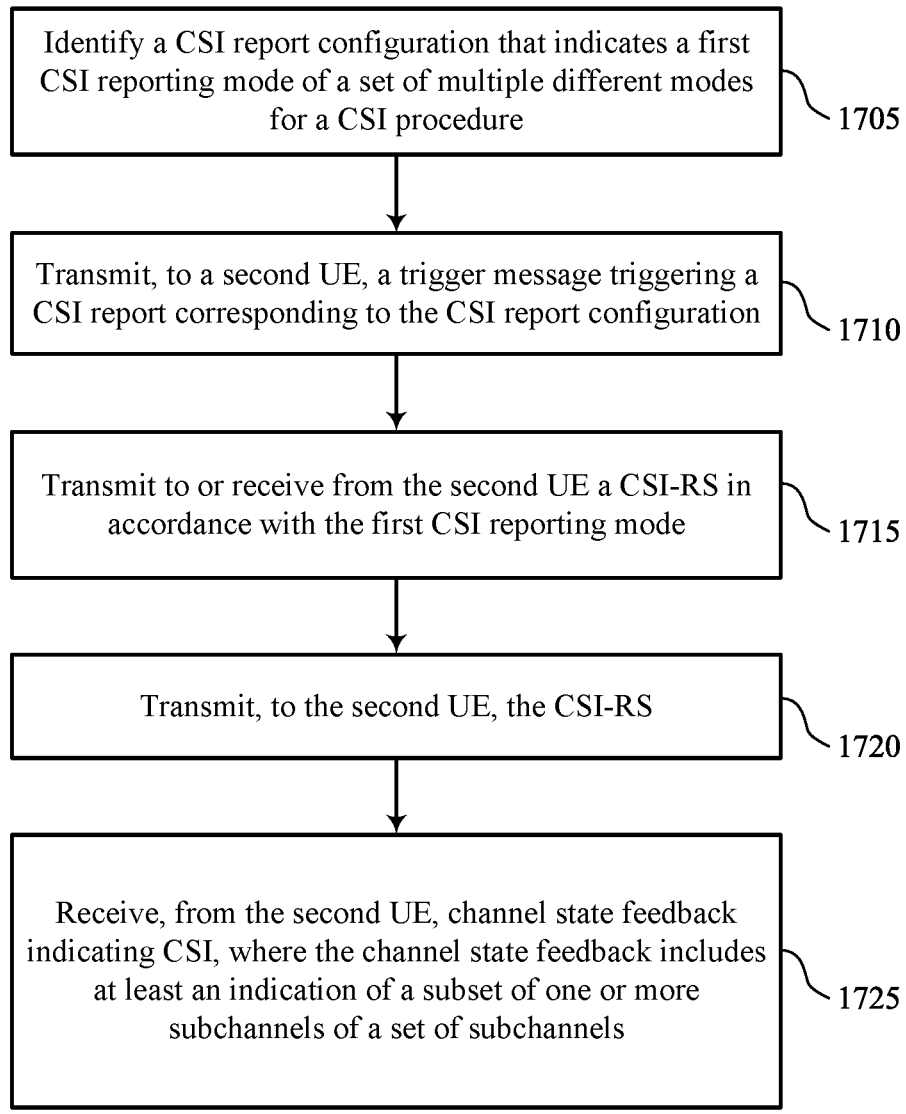

Identify a CSI report configuration that indicates a first CSI reporting mode of a set of multiple different modes for a CSI procedure

1705

Transmit, to a second UE, a trigger message triggering a CSI report corresponding to the CSI report configuration

1710

Transmit to or receive from the second UE a CSI-RS in accordance with the first CSI reporting mode

1715

Transmit, to the second UE, the CSI-RS

1720

Receive, from the second UE, channel state feedback indicating CSI, where the channel state feedback includes at least an indication of a subset of one or more subchannels of a set of subchannels

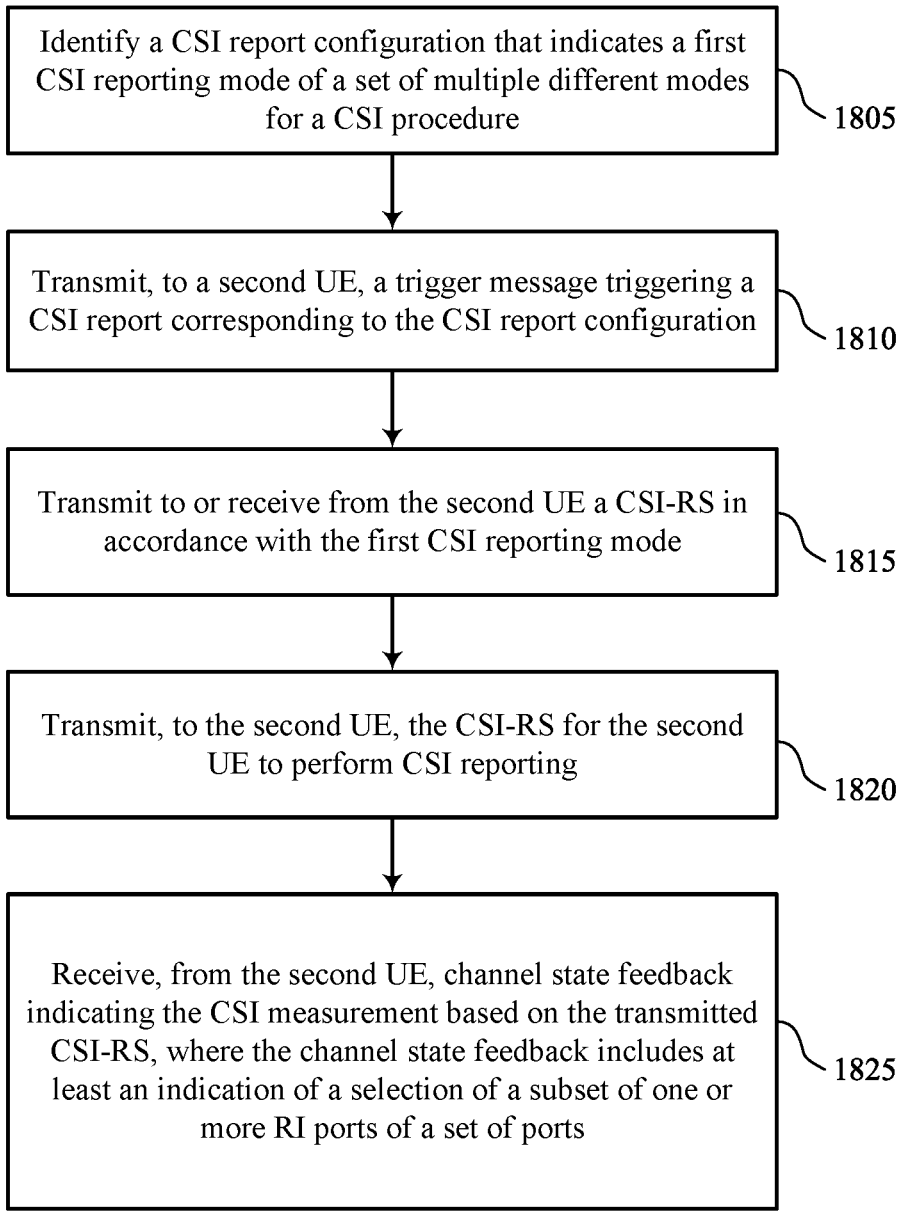

Identify a CSI report configuration that indicates a first CSI reporting mode of a set of multiple different modes for a CSI procedure

1805

Transmit, to a second UE, a trigger message triggering a CSI report corresponding to the CSI report configuration

1810

Transmit to or receive from the second UE a CSI-RS in accordance with the first CSI reporting mode

1815

Transmit, to the second UE, the CSI-RS for the second UE to perform CSI reporting

1820

Receive, from the second UE, channel state feedback indicating the CSI measurement based on the transmitted CSI-RS, where the channel state feedback includes at least an indication of a selection of a subset of one or more RI ports of a set of ports

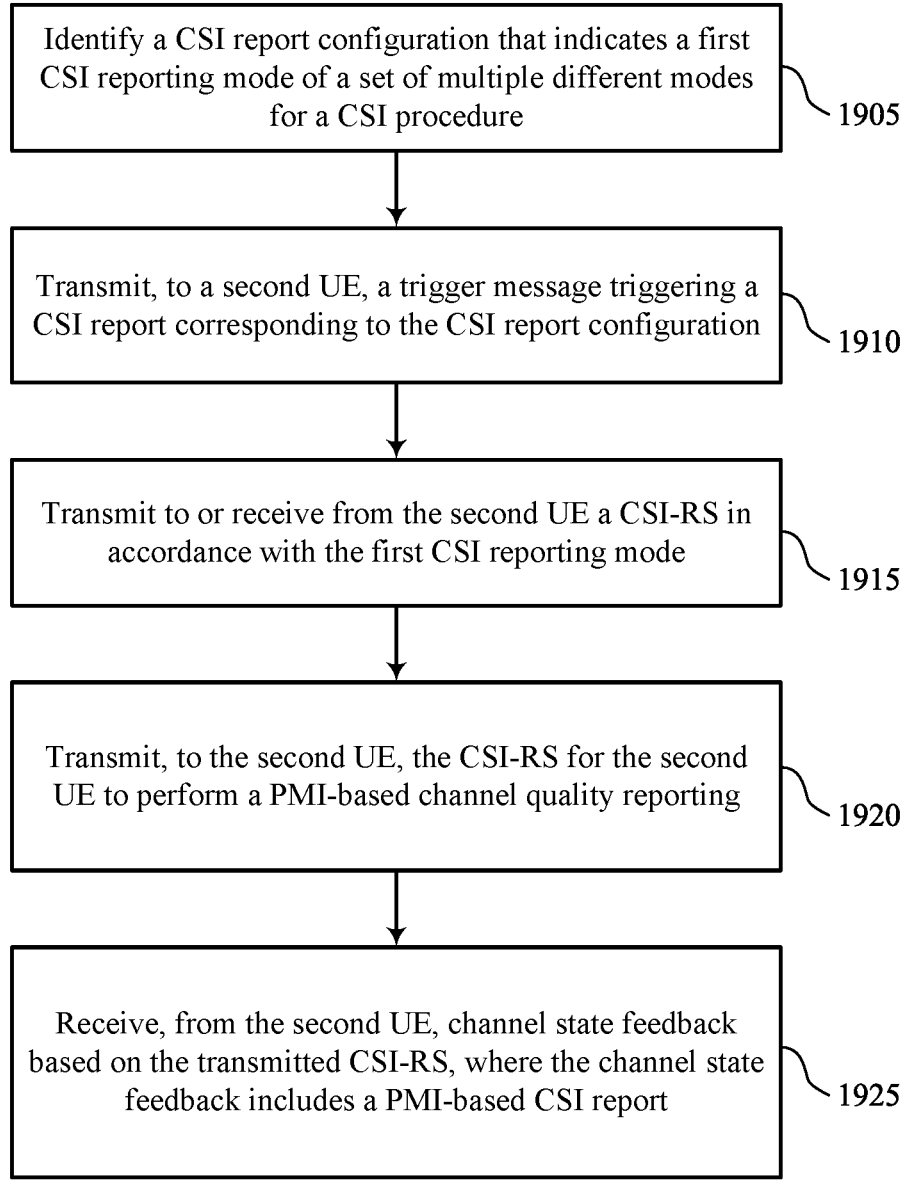

Identify a CSI report configuration that indicates a first CSI reporting mode of a set of multiple different modes for a CSI procedure

1905

Transmit, to a second UE, a trigger message triggering a CSI report corresponding to the CSI report configuration

1910

Transmit to or receive from the second UE a CSI-RS in accordance with the first CSI reporting mode

1915

Transmit, to the second UE, the CSI-RS for the second UE to perform a PMI-based channel quality reporting

1920

Receive, from the second UE, channel state feedback based on the transmitted CSI-RS, where the channel state feedback includes a PMI-based CSI report

Receive, from a first UE, a trigger message triggering a CSI report

2005

Identify a CSI report configuration for the triggered CSI report, the CSI report configuration indicating a first CSI reporting mode of a set of multiple different modes for a CSI procedure

2010

Transmit to or receive from the first UE a CSI-RS in accordance with the first CSI reporting mode

2015

2000

UNIFIED CHANNEL STATE INFORMATION FRAMEWORK FOR SIDELINK COMMUNICATIONS

CROSS REFERENCE

The present Application is a 371 national stage filing of International PCT Application No. PCT/CN2021/076855 by Hao et al. entitled "UNIFIED CHANNEL STATE INFORMATION FRAMEWORK FOR SIDELINK COMMUNICATIONS," filed Feb. 19, 2021, which is assigned to the assignee hereof, and which is expressly incorporated by reference in its entirety herein.

FIELD OF TECHNOLOGY

The following relates to wireless communications, including unified channel state information (CSI) framework for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a first UE may communicate with a second UE via sidelink communications. Efficient techniques are desired for enabling sidelink communications.

SUMMARY

The described techniques relate to improved methods, systems, devices, and apparatuses that support unified channel state information (CSI) framework for sidelink communications. Generally, the described techniques provide for a first user equipment (UE) to transmit a trigger message to a second UE, where the trigger message triggers a CSI report that includes a first CSI reporting mode of a set of CSI reporting modes and a reporting quantity for the first CSI reporting mode. Based on the first CSI reporting mode and the reporting quantity, the first UE or the second UE may transmit a CSI reference signal (RS) to the other UE. For example, for a first reporting quantity (e.g., for antenna switching), the first UE may trigger the second UE to transmit the CSI-RS (e.g., using different antennas), and the first UE may then receive the CSI-RS to determine CSI based on the CSI-RS. Additionally or alternatively, for other reporting quantities (e.g., for subchannel selection, for channel quality indicator (CQI) reporting, rank indicator (RI)

reporting, precoding matrix indicator (PMI) reporting, etc.), the first UE may transmit the CSI-RS to the second UE, and the second UE may transmit channel state feedback to the first UE based on measuring CSI for the received CSI-RS, where the first UE determines the CSI based on the channel state feedback.

A method for wireless communications at a first UE is described. The method may include identifying a CSI report configuration that indicates a first CSI reporting mode of a set of multiple different modes for a CSI procedure; transmitting, to a second UE, a trigger message triggering a CSI report corresponding to the CSI report configuration; and transmitting to or receiving from the second UE a CSI-RS in accordance with the first CSI reporting mode.

An apparatus for wireless communications at a first UE is described. The apparatus may include a processor, memory coupled with the processor, and instructions stored in the memory. The instructions may be executable by the processor to cause the apparatus to identify a CSI report configuration that indicates a first CSI reporting mode of a set of multiple different modes for a CSI procedure; to transmit, to a second UE, a trigger message triggering a CSI report corresponding to the CSI report configuration; and to transmit to or receive from the second UE a CSI-RS in accordance with the first CSI reporting mode.

Another apparatus for wireless communications at a first UE is described. The apparatus may include means for identifying a CSI report configuration that indicates a first CSI reporting mode of a set of multiple different modes for a CSI procedure; means for transmitting, to a second UE, a trigger message triggering a CSI report corresponding to the CSI report configuration; and means for transmitting to or receiving from the second UE a CSI-RS in accordance with the first CSI reporting mode.

A non-transitory computer-readable medium storing code for wireless communications at a first UE is described. The code may include instructions executable by a processor to identify a CSI report configuration that indicates a first CSI reporting mode of a set of multiple different modes for a CSI procedure; to transmit, to a second UE, a trigger message triggering a CSI report corresponding to the CSI report configuration; and to transmit to or receive from the second UE a CSI-RS in accordance with the first CSI reporting mode.

In some examples of the method, apparatuses, and non-transitory computer-readable medium described herein, the first CSI reporting mode includes a reporting quantity that configures or triggers the second UE to transmit the CSI-RS and the method, apparatuses, and non-transitory computer-readable medium may include further operations, features, means, or instructions for receiving, from the second UE, the CSI-RS and measuring CSI based on the received CSI-RS.

In some examples of the method, apparatuses, and non-transitory computer-readable medium described herein, the reporting quantity may be set to antenna switching.

Some examples of the method, apparatuses, and non-transitory computer-readable medium described herein may further include operations, features, means, or instructions for determining a CSI-RS resource for the second UE to transmit the CSI-RS based on transmitting a second trigger message, transmitting a CSI-RS resource configuration associated with the first CSI reporting mode, or both.

Some examples of the method, apparatuses, and non-transitory computer-readable medium described herein may further include operations, features, means, or instructions for receiving, from the second UE, a UE capability report indicating a number of transmit antennas at the second UE, a number of receive antennas at the second UE, or both and transmitting the trigger message or a configuration message that indicates a CSI-RS resource that may be selected based on the UE capability report.

Some examples of the method, apparatuses, and non-transitory computer-readable medium described herein may further include operations, features, means, or instructions for determining that the number of receive antennas at the second UE may be greater than the number of transmit antennas at the second UE, where the number of receive antennas may be greater than the number of transmit antennas by a multiplying factor and determining that a CSI-RS resource associated with the first CSI reporting mode includes a number of symbols corresponding to the multiplying factor, where one or more first CSI-RS ports transmitted on a first symbol of the number of symbols may be associated with a first set of antenna ports of the second UE that may be different than a second set of antenna ports of the second UE used to transmit one or more second CSI-RS ports transmitted on a second symbol of the number of symbols.

In some examples of the method, apparatuses, and non-transitory computer-readable medium described herein, the CSI-RS resource includes a number of resources corresponding to the multiplying factor, each resource of the number of resources being transmitted on a respective symbol of the number of symbols, and the one or more first CSI-RS ports may be transmitted in a first resource of the number of resources and the one or more second CSI-RS ports may be transmitted in a second resource of the number of resources.

In some examples of the method, apparatuses, and non-transitory computer-readable medium described herein, the CSI-RS resource includes a single resource with a number of different symbol locations corresponding to the multiplying factor.

In some examples of the method, apparatuses, and non-transitory computer-readable medium described herein, a gap may be configured between any two symbols of the number of symbols, the gap being based on the UE capability report received from the second UE.

In some examples of the method, apparatuses, and non-transitory computer-readable medium described herein, the first CSI reporting mode includes a reporting quantity that configures or triggers the second UE to perform a subchannel selection and the method, apparatuses, and non-transitory computer-readable medium may include further operations, features, means, or instructions for transmitting, to the second UE, the CSI-RS and receiving, from the second UE, channel state feedback indicating CSI, where the channel state feedback includes at least an indication of a subset of one or more subchannels of a set of multiple subchannels.

Some examples of the method, apparatuses, and non-transitory computer-readable medium described herein may further include operations, features, means, or instructions for receiving, from the second UE, the channel state feedback including the indication of the subset of one or more subchannels based on a signal measurement of each subchannel of the subset of one or more subchannels satisfying a threshold.

In some examples of the method, apparatuses, and non-transitory computer-readable medium described herein, the signal measurement includes a reference signal received power (RSRP) measurement, a signal-to-interference-plus-noise ratio (SINR), a signal-to-noise ratio (SNR), a spectral efficiency measurement, or a combination thereof.

In some examples of the method, apparatuses, and non-transitory computer-readable medium described herein, the threshold may be configured via control signaling, by a network device, by the first UE, may be predefined, or a combination thereof.

Some examples of the method, apparatuses, and non-transitory computer-readable medium described herein may further include operations, features, means, or instructions for transmitting, to the second UE, an indication of a number of subchannels for the second UE to indicate in the channel state feedback, where the indication of the subset of one or more subchannels may be based on the indication of the number of subchannels.

In some examples of the method, apparatuses, and non-transitory computer-readable medium described herein, the indication of the number of subchannels includes a number of total subchannels to perform a CSI measurement, a number of subchannels to be selected by the second UE, or both.

In some examples of the method, apparatuses, and non-transitory computer-readable medium described herein, the subset of one or more subchannels includes a selection of consecutive or non-consecutive subchannels of the set of multiple subchannels.

In some examples of the method, apparatuses, and non-transitory computer-readable medium described herein, the first CSI reporting mode includes a reporting quantity that configures or triggers the second UE to perform a channel quality reporting including at least an RI and a CQI and the method, apparatuses, and non-transitory computer-readable medium may include further operations, features, means, or instructions for transmitting, to the second UE, the CSI-RS for the second UE to perform CSI reporting and receiving, from the second UE, channel state feedback indicating a CSI measurement based on the transmitted CSI-RS, where the channel state feedback includes at least an indication of a selection of a subset of one or more RI ports of a set of multiple ports.

In some examples of the method, apparatuses, and non-transitory computer-readable medium described herein, a RI value for the subset of one or more RI ports may be configured by the first UE, reported by the second UE, or a combination thereof.

In some examples of the method, apparatuses, and non-transitory computer-readable medium described herein, the first CSI reporting mode includes a reporting quantity that configures or triggers the second UE to perform a PMI-based channel quality reporting and the method, apparatuses, and non-transitory computer-readable medium may include further operations, features, means, or instructions for transmitting, to the second UE, the CSI-RS for the second UE to perform the PMI-based channel quality reporting and receiving, from the second UE, channel state feedback based on the transmitted CSI-RS, where the channel state feedback includes a PMI-based CSI report.

In some examples of the method, apparatuses, and non-transitory computer-readable medium described herein, the PMI-based CSI report includes an RI, one or more PMIs, one or more CQIs, or a combination thereof for a total number of subchannels or a subset of the number of subchannels.

In some examples of the method, apparatuses, and non-transitory computer-readable medium described herein, each of the set of multiple different modes for the CSI procedure may be linked to a CSI-RS resource for channel measurement and for interference measurement.

Some examples of the method, apparatuses, and non-transitory computer-readable medium described herein may further include operations, features, means, or instructions for receiving, from the second UE, the CSI report including a first part and a second part, the first part including a fixed payload and the second part including a variable payload that may be determined based on a reporting content in the first part, where the first part includes at least one of a subchannel selection, an RI, a CQI, a number of non-zero coefficients, or a combination thereof; and the second part includes at least one of a PMI for a subset of selected subchannels of a set of multiple subchannels, a CQI for the subset of selected subchannels, a PMI for the set of multiple subchannels, or a combination thereof, where a CSI measurement may be determined based on the first part and the second part of the CSI report.

In some examples of the method, apparatuses, and non-transitory computer-readable medium described herein, the first part may be received via a second stage sidelink control information (SCI) message and the second part may be received via a physical sidelink shared channel (PSSCH).

A method for wireless communications at a second UE is described. The method may include receiving, from a first UE, a trigger message triggering a CSI report; identifying a CSI report configuration for the triggered CSI report, the CSI report configuration indicating a first CSI reporting mode of a set of multiple different modes for a CSI procedure; and transmitting to or receiving from the first UE a CSI-RS in accordance with the first CSI reporting mode.

An apparatus for wireless communications at a second UE is described. The apparatus may include a processor, memory coupled with the processor, and instructions stored in the memory. The instructions may be executable by the processor to cause the apparatus to receive, from a first UE, a trigger message triggering a CSI report; to identify a CSI report configuration for the triggered CSI report, the CSI report configuration indicating a first CSI reporting mode of a set of multiple different modes for a CSI procedure; and to transmit to or receive from the first UE a CSI-RS in accordance with the first CSI reporting mode.

Another apparatus for wireless communications at a second UE is described. The apparatus may include means for receiving, from a first UE, a trigger message triggering a CSI report; means for identifying a CSI report configuration for the triggered CSI report, the CSI report configuration indicating a first CSI reporting mode of a set of multiple different modes for a CSI procedure; and means for transmitting to or receiving from the first UE a CSI-RS in accordance with the first CSI reporting mode.

A non-transitory computer-readable medium storing code for wireless communications at a second UE is described. The code may include instructions executable by a processor to receive, from a first UE, a trigger message triggering a CSI report; to identify a CSI report configuration for the triggered CSI report, the CSI report configuration indicating a first CSI reporting mode of a set of multiple different modes for a CSI procedure; and to transmit to or receive from the first UE a CSI-RS in accordance with the first CSI reporting mode.

In some examples of the method, apparatuses, and non-transitory computer-readable medium described herein, the first CSI reporting mode includes a reporting quantity that configures or triggers the second UE to transmit the CSI-RS and the method, apparatuses, and non-transitory computer-readable medium may include further operations, features, means, or instructions for transmitting, to the first UE, the CSI-RS.

In some examples of the method, apparatuses, and non-transitory computer-readable medium described herein, the first CSI reporting mode includes a reporting quantity that configures or triggers the second UE to perform a subchannel selection and the method, apparatuses, and non-transitory computer-readable medium may include further operations, features, means, or instructions for receiving, from the first UE, the CSI-RS and transmitting, to the first UE, channel state feedback indicating CSI, where the channel state feedback includes at least an indication of a subset of one or more subchannels of a set of multiple subchannels.

In some examples of the method, apparatuses, and non-transitory computer-readable medium described herein, the first CSI reporting mode includes a reporting quantity that configures or triggers the second UE to transmit the CSI report and the method, apparatuses, and non-transitory computer-readable medium may include further operations, features, means, or instructions for receiving, from the first UE, the CSI-RS for the second UE to perform CSI reporting for transmitting the CSI report and transmitting, to the first UE, the CSI report based on the received CSI-RS, where the CSI report includes a first part and a second part, the first part transmitted via a second-stage SCI message and the second part transmitted via a PSSCH.

In some examples of the method, apparatuses, and non-transitory computer-readable medium described herein, the first CSI reporting mode includes a reporting quantity that configures or triggers the second UE to perform a channel quality reporting including at least a RI and a CQI and the method, apparatuses, and non-transitory computer-readable medium may include further operations, features, means, or instructions for receiving, from the first UE, the CSI-RS for the second UE to perform CSI reporting and transmitting, to the first UE, channel state feedback indicating a CSI measurement based on the received CSI-RS, where the channel state feedback includes at least an indication of a selection of a subset of one or more RI ports of a set of multiple ports.

In some examples of the method, apparatuses, and non-transitory computer-readable medium described herein, the first CSI reporting mode includes a reporting quantity that configures or triggers the second UE to perform a PMI-based channel quality reporting and the method, apparatuses, and non-transitory computer-readable medium may include further operations, features, means, or instructions for receiving, from the first UE, the CSI-RS for the second UE to perform the PMI-based channel quality reporting and transmitting, to the first UE, channel state feedback based on the received CSI-RS, where the channel state feedback includes a PMI-based CSI report.

7

Figure 6:
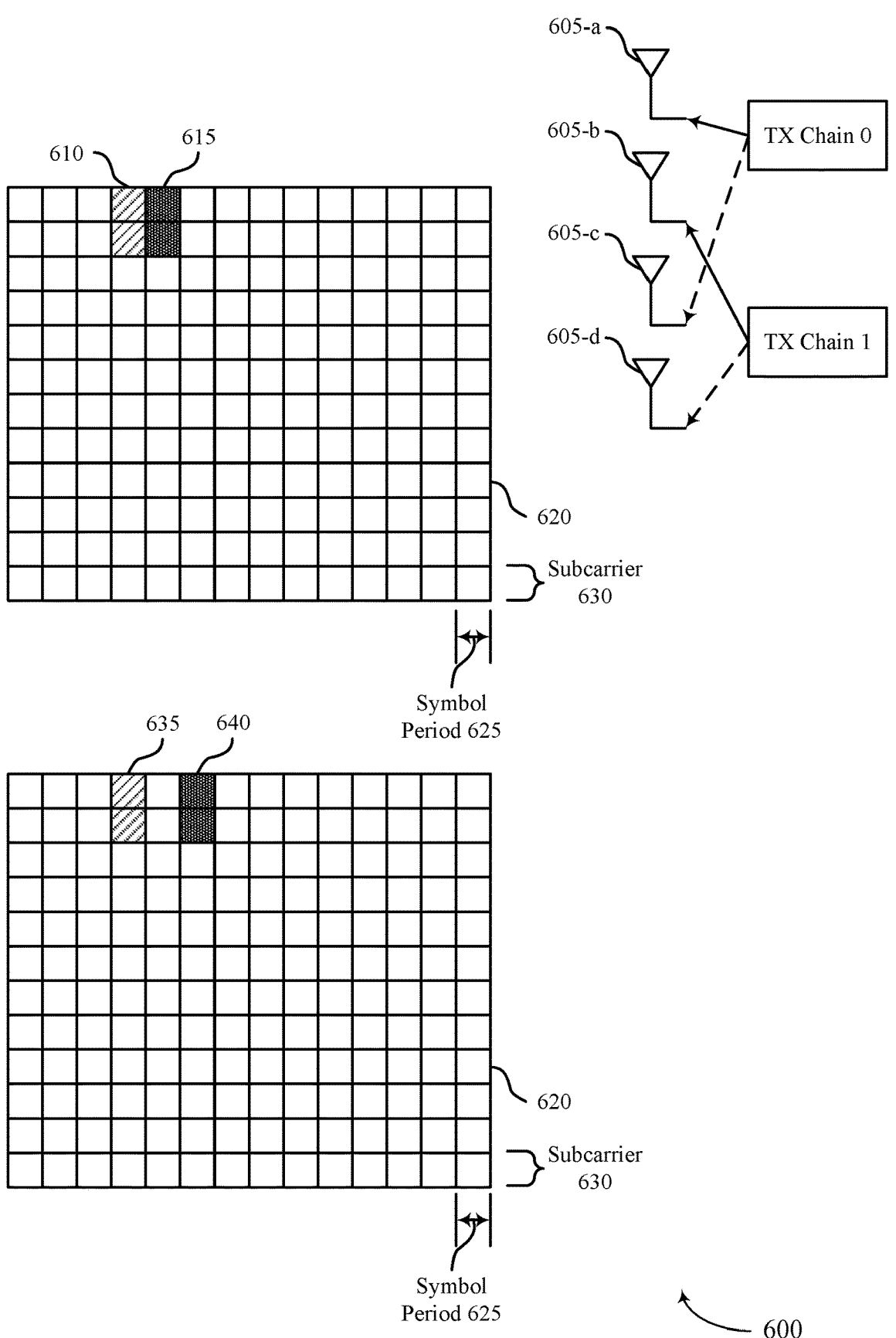

FIG. 6 illustrates an example of an antenna switching CSI report configuration that supports a unified CSI framework for sidelink communications in accordance with aspects of the present disclosure.

Figure 7:
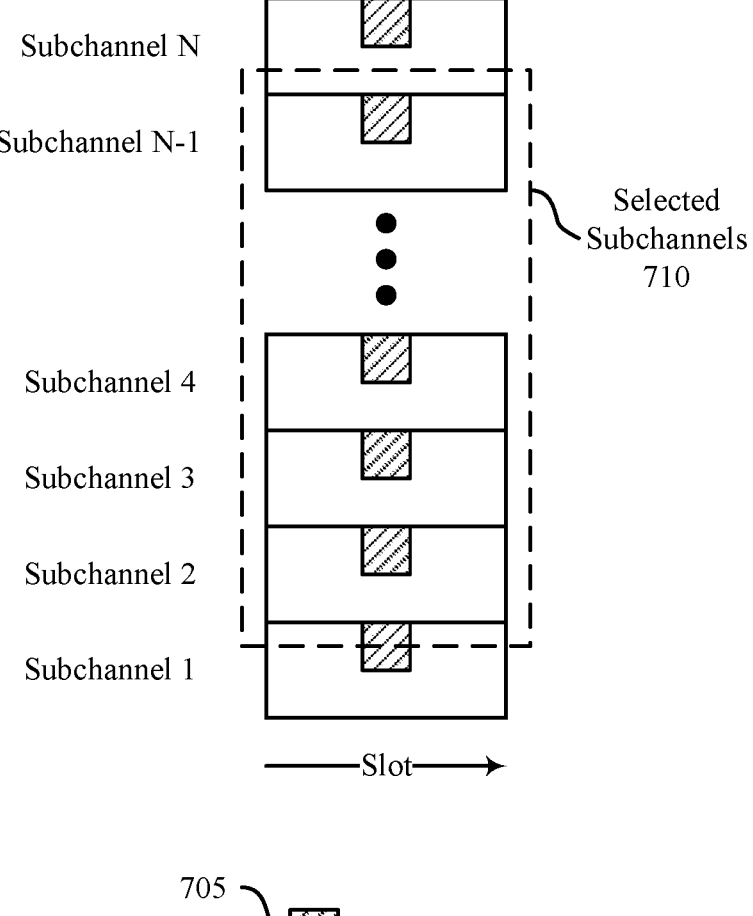

FIG. 7 illustrates an example of a subchannel selection CSI report configuration that supports a unified CSI framework for sidelink communications in accordance with aspects of the present disclosure.

FIG. 8 illustrates an example of a reporting configuration that supports unified CSI framework for sidelink communications in accordance with aspects of the present disclosure.

Figure 9:
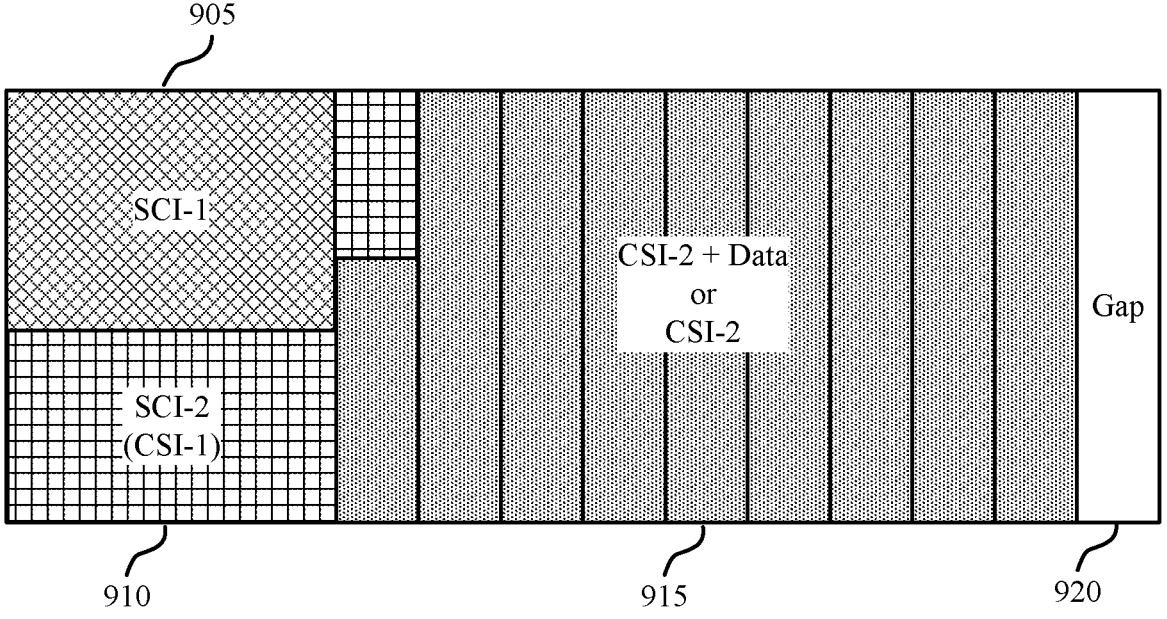

FIG. 9 illustrates an example of a CSI report configuration that supports a unified CSI framework for sidelink communications in accordance with aspects of the present disclosure.

Figure 10:
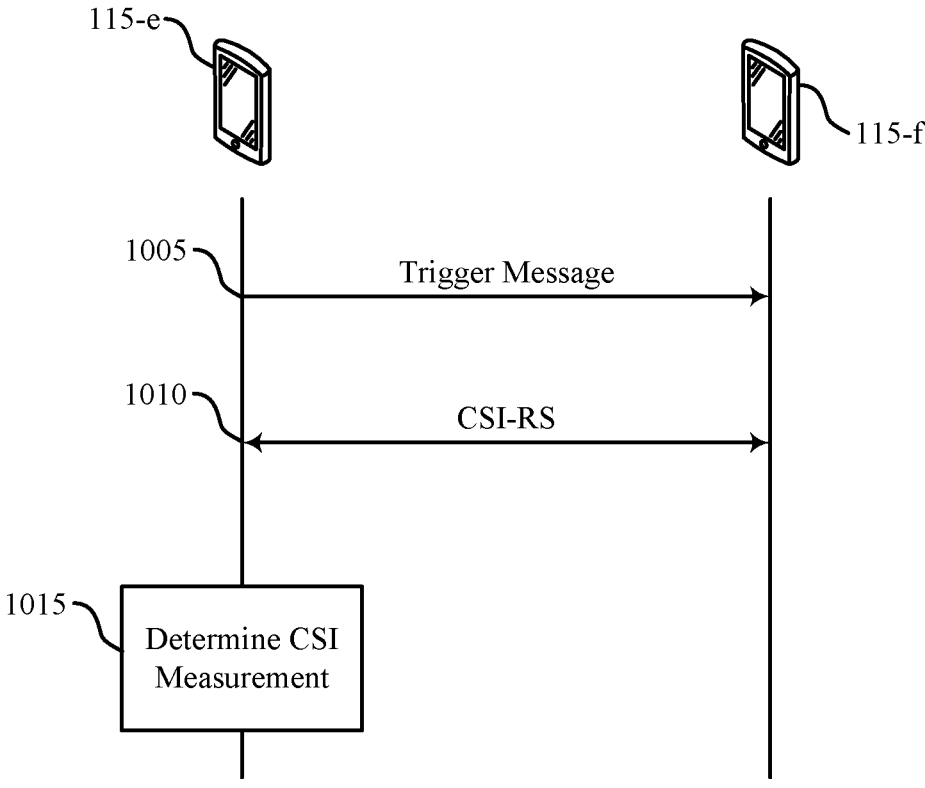

FIG. 10 illustrates an example of a process flow that supports a unified CSI framework for sidelink communications in accordance with aspects of the present disclosure.

Figure 11:
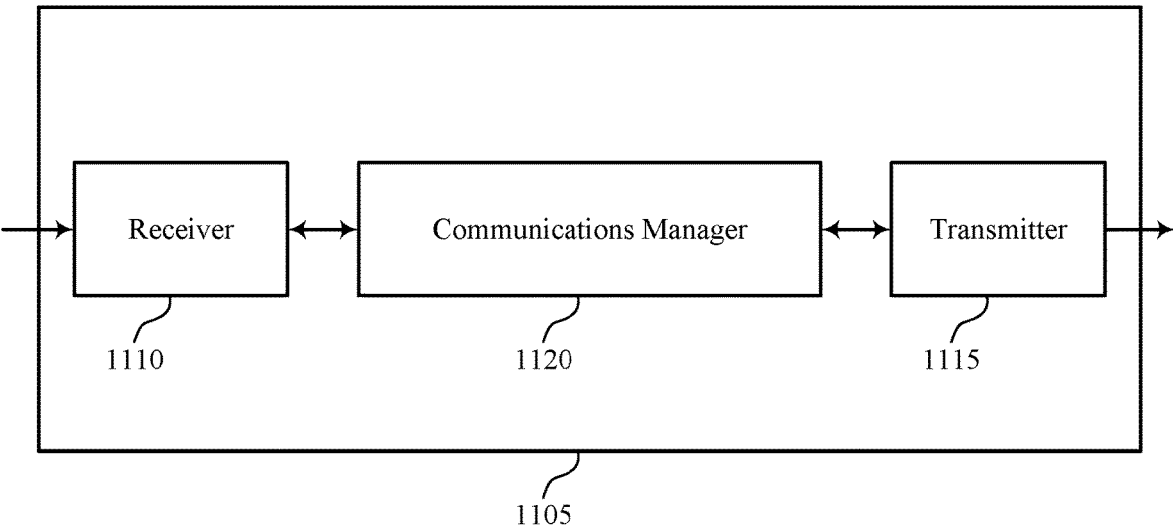
Figure 12:
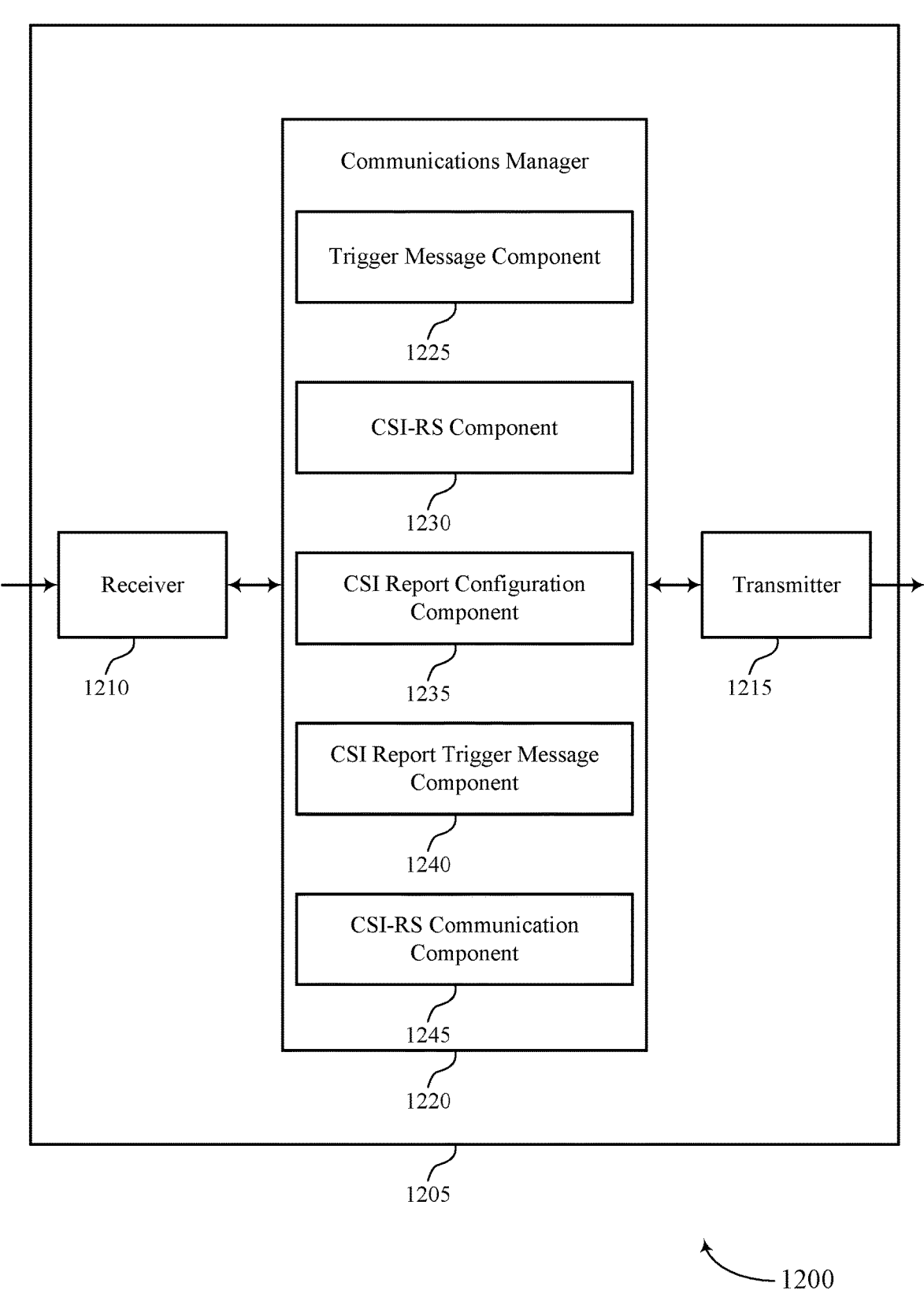

FIGS. 11 and 12 show block diagrams of devices that support unified channel state information framework for sidelink communications in accordance with aspects of the present disclosure.

Figure 13:
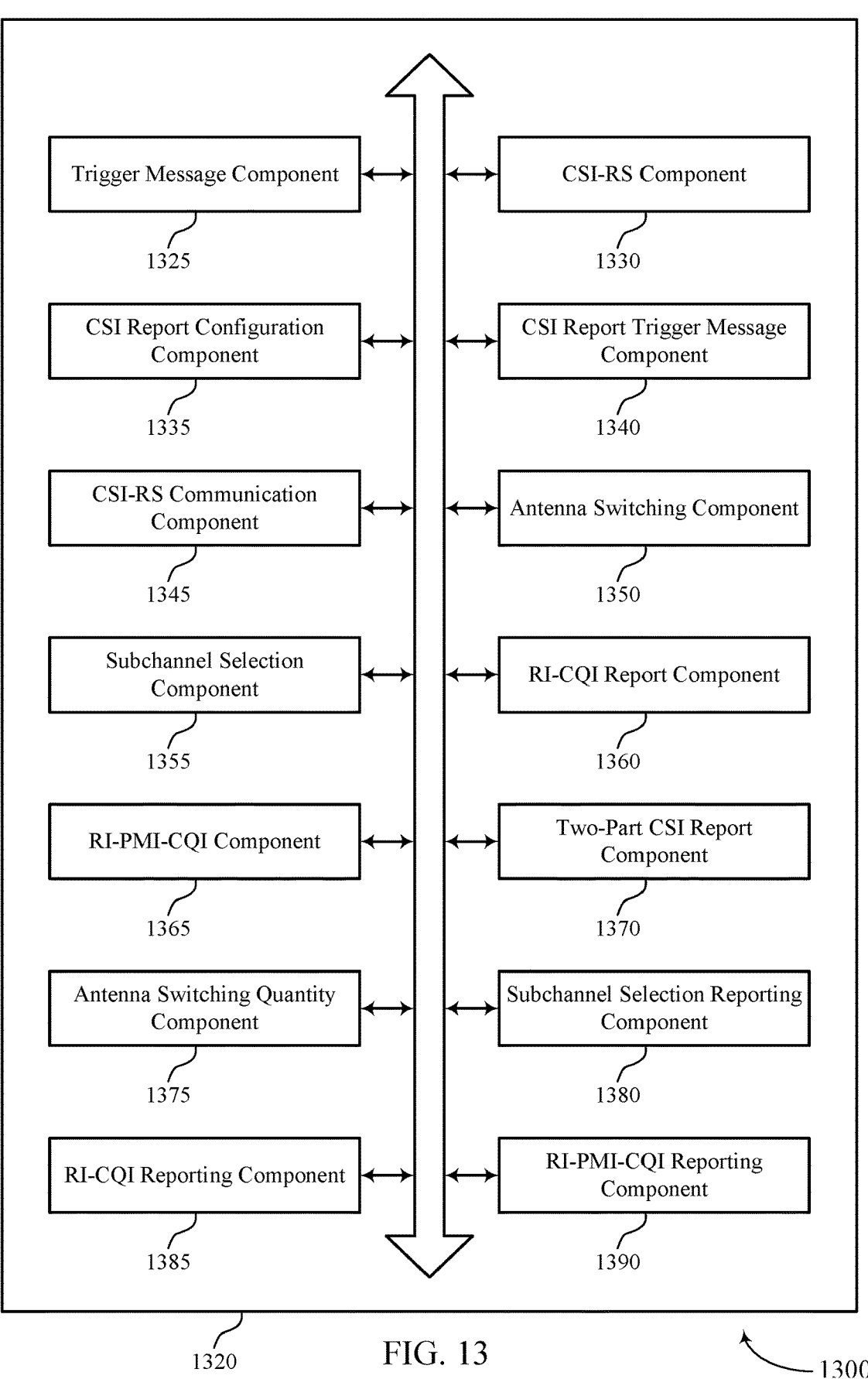

FIG. 13 shows a block diagram of a communications manager that supports unified channel state information framework for sidelink communications in accordance with aspects of the present disclosure.

Figure 14:
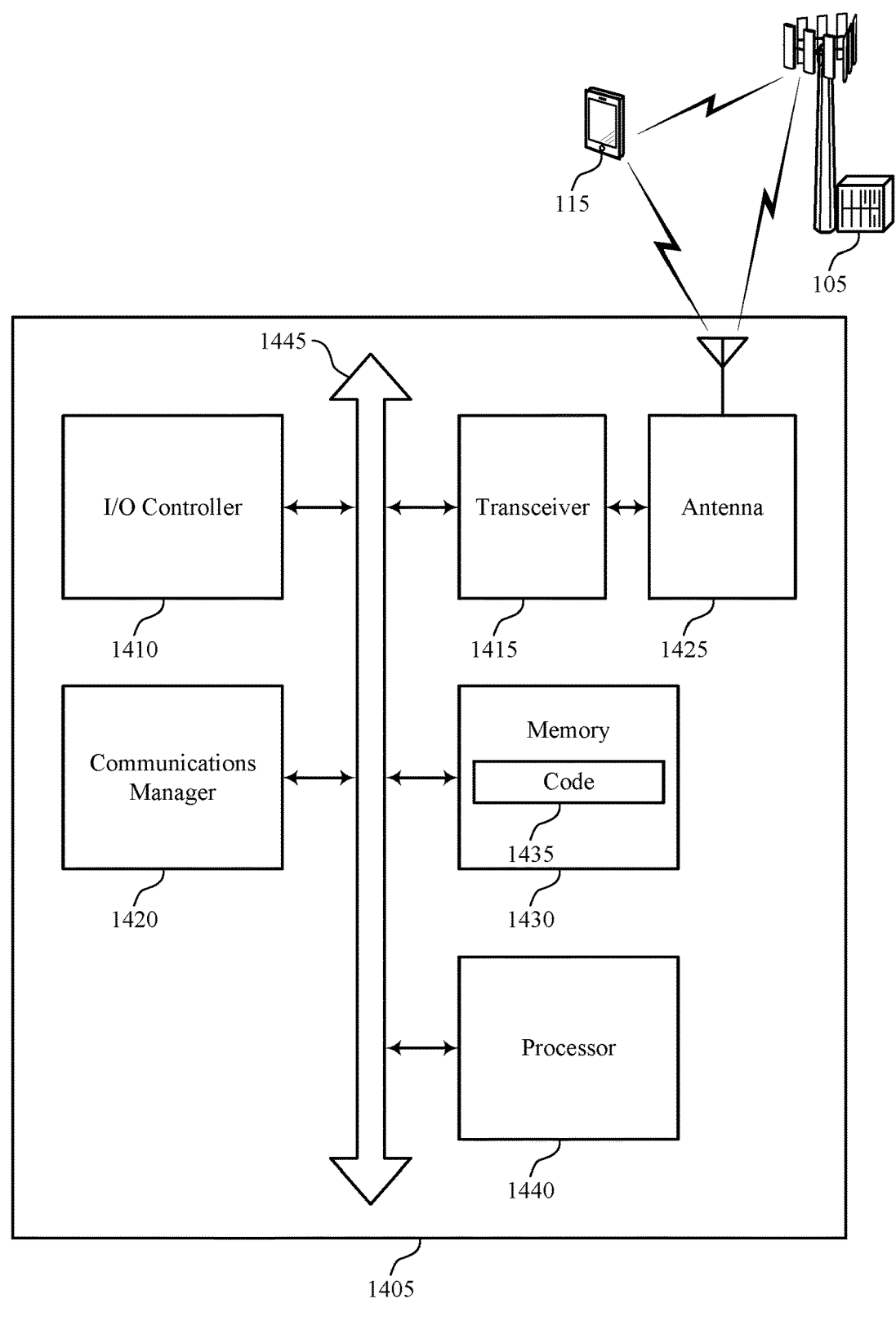

FIG. 14 shows a diagram of a system including a device that supports unified channel state information framework for sidelink communications in accordance with aspects of the present disclosure.

FIGS. 15 through 20 show flowcharts illustrating methods that support unified channel state information framework for sidelink communications in accordance with aspects of the present disclosure.

DETAILED DESCRIPTION

For sidelink communications between two user equipments (UEs), the two UEs may perform a channel state information (CSI) reporting procedure to determine a desired configuration to enhance sidelink communications. For example, a first UE may transmit a CSI request to a second UE in a sidelink control information (SCI) message that schedules a sidelink data transmission. The first UE may then transmit one or more CSI reference signals (CSI-RSs) to the second UE in a same subchannel of a physical sidelink shared channel (PSSCH. The second UE may then measure the CSI-RSs to determine the CSI and transmit a CSI report back to the first UE for the first UE to determine the desired configuration for subsequent transmissions.

However, this CSI procedure may include deficiencies. For example, CSI-RSs may be transmitted on same subchannels as sidelink data transmissions, so reported CSI may not provide CSI for overall subchannels of interest (e.g., the reported CSI may provide CSI for the same subchannels as the sidelink data transmissions alone). Additionally, a CSI report may be transmitted after a sidelink data transmission, and thus, the sidelink data transmission may be transmitted without the benefit of CSI information. Additionally, reciprocal-based CSI reporting may not be supported. In reciprocal-based CSI reporting, the UE that receives a CSI request transmits a CSI-RS while the UE that triggers CSI reporting performs the CSI measurement based on the CSI-RS. Conversely, in non-reciprocal-based CSI reporting, the UE that triggers the CSI reporting transmits the CSI-RS and receives a CSI measurement from a different UE.

The techniques described herein are directed to supporting both reciprocal and non-reciprocal-based CSI reporting, as well as permitting UEs to configure one or more reporting quantities to specify which type of CSI reporting is performed. The techniques may provide more granular control of CSI reporting, where the UEs configure which UE transmits the CSI-RS, which UE measures the CSI-RS, and the type of report quantity being reported. For example, as described herein, a first UE may transmit a trigger (e.g., a CSI request that triggers a CSI trigger state or CSI report) to a second UE indicating a mode (e.g., reciprocal and non-reciprocal-based CSI reporting) with a type of reporting quantity for the mode. Subsequently, CSI reporting or a CSI-RS transmission may occur corresponding to the configured report quantity. For example, when configuring the second UE with a CSI reporting mode (e.g., via the trigger), the first UE may also indicate a reporting quantity for the CSI reporting mode.

The reporting quantity may configure the second UE to perform antenna switching, to perform a subchannel selection, to perform a channel quality report, to perform a precoding matrix indicator (PMI)-based channel quality report, or a combination thereof. For an antenna switching reporting quantity in reciprocal-based CSI reporting, the second UE may transmit the CSI-RS, where each CSI-RS port is transmitted using a respective antenna port. In some cases, the trigger message or another trigger message further indicates a CSI-RS resource/resource-set configuration to be used for the triggered CSI report. In some cases, the CSI-RS resource/resource-set configuration to be used for the triggered CSI report is configured via RRC. In this case, once a CSI report is triggered, the respective UE will know the associated CSI-RS resource/resource-set configuration based on the RRC configuration, there is no need of additional indication for the associated CSI-RS resource/resource-set. Additionally or alternatively, for the antenna switching reporting quantity in the reciprocal-based CSI reporting, the second UE may transmit a sounding reference signal (SRS) rather than a CSI-RS or in addition to the CSI-RS.

The remaining reporting quantities may be used for non-reciprocal based CSI acquisition, where the first UE transmits the CSI-RSs, and the second UE then performs subchannel selection, determines a channel quality (e.g., non-PMI-based or PMI-based), or a combination thereof to then transmit a CSI report back to the first UE. Beneficially, the techniques described herein may permit sidelink UEs to indicate which CSI mode to use and one or more reporting quantities to control CSI reporting granularity. Moreover, a sidelink UE having data to transmit (e.g., sidelink data) may trigger CSI reporting prior to a sidelink data transmission, permitting the sidelink data transmission to use a CSI measurement for the sidelink data transmission to enhance the likelihood of a successful transmission.

Aspects of the disclosure are initially described in the context of wireless communications systems. Additionally, aspects of the disclosure are illustrated through an additional wireless communications system, resource reservations, a sidelink CSI-RS configuration, CSI acquisitions, an antenna switching CSI report configuration, a subchannel selection CSI report configuration, a reporting configuration, a CSI report configuration, and a process flow. Aspects of the disclosure are further illustrated by and described with reference to apparatus diagrams, system diagrams, and flowcharts that relate to unified CSI framework for sidelink communications.

Figure 1:
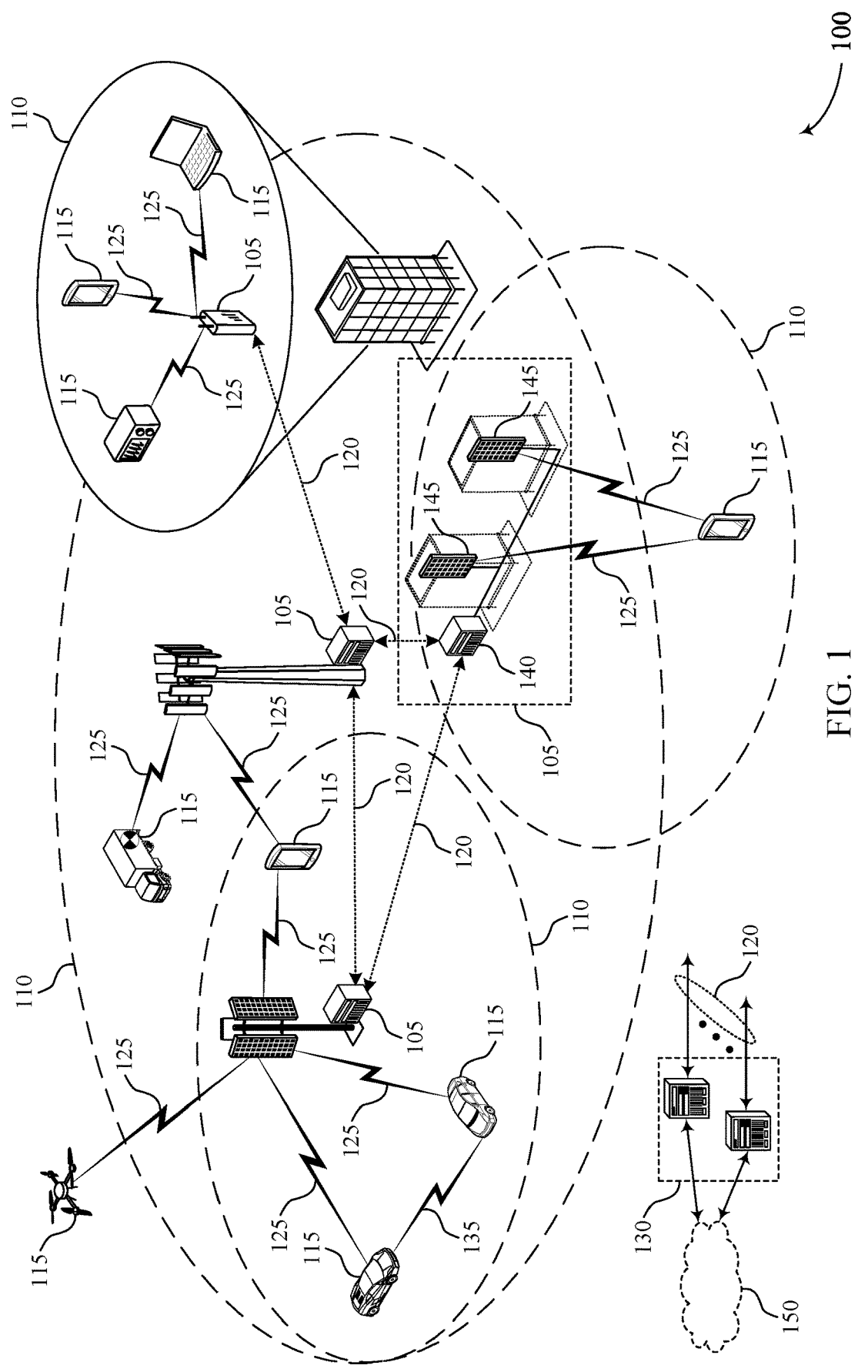
FIG. 1 illustrates an example of a wireless communications system that supports a unified channel state information (CSI) framework for sidelink communications in accordance with aspects of the present disclosure.

FIG. 1 illustrates an example of a wireless communications system 100 that supports unified CSI framework for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/ (\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

For sidelink communications between two UEs 115, the two UEs 115 may perform a CSI reporting procedure to determine a desired configuration to enhance sidelink communications. For example, a first UE 115 may transmit a CSI request to a second UE 115 in an SCI message that schedules a sidelink data transmission. The first UE 115 may then transmit one or more CSI-RSs to the second UE 115 in a same subchannel of a PSSCH. The second UE 115 may then measure the CSI-RSs to determine the CSI and transmit a CSI report back to the first UE 115 for the first UE 115 to determine the desired configuration for subsequent transmissions.

However, this CSI procedure may include deficiencies. For example, CSI-RSs may be transmitted on same subchannels as sidelink data transmissions, so reported CSI may not provide CSI for overall subchannels of interest (e.g., the reported CSI may provide CSI for the same subchannels as the sidelink data transmissions alone). Additionally, a CSI report may be transmitted after a sidelink data transmission, and thus, the sidelink data transmission may be transmitted without the benefit of CSI information. Additionally, reciprocal-based CSI reporting may not be supported. In reciprocal-based CSI reporting, the UE that receives a CSI request transmits a CSI-RS while the UE 115 that triggers CSI reporting performs the CSI measurement based on the CSI-RS. Conversely, in non-reciprocal-based CSI reporting, the UE 115 that triggers CSI reporting transmits the CSI-RS and receives a CSI measurement from a different UE 115.

Wireless communications system 100 may support a unified CSI framework for sidelink communications to enable reciprocal-based and non-reciprocal based CSI reporting. For example, a first UE 115 (e.g., source UE 115, transmitting UE 115, etc.) may transmit a trigger message (e.g., a CSI request that triggers a CSI trigger state or a CSI report) to a second UE (e.g., destination UE 115, receiving UE 115, etc.), where the trigger message triggers a CSI report that includes a first CSI reporting mode of a set of CSI reporting modes and a reporting quantity for the first CSI reporting mode. Based on the first CSI reporting mode and the reporting quantity, the first UE 115 or the second UE 115 may transmit a CSI-RS to the other UE 115. For example, for a first reporting quantity (e.g., for antenna switching), the first UE may trigger the second UE to transmit the CSI-RS (e.g., using different antennas), and the first UE may then receive the CSI-RS to determine CSI based on the CSI-RS (e.g., reciprocal-based CSI reporting). Additionally or alternatively, for other reporting quantities (e.g., for subchannel selection, for channel quality indicator (CQI) reporting, rank indicator (RI) reporting, precoding matrix indicator (PMI) reporting, etc.), the first UE may transmit the CSI-RS to the second UE, and the second UE may transmit channel state feedback to the first UE based on measuring CSI for the received CSI-RS, where the first UE determines the CSI based on the channel state feedback (e.g., non-reciprocal-based CSI reporting).

Figure 2:
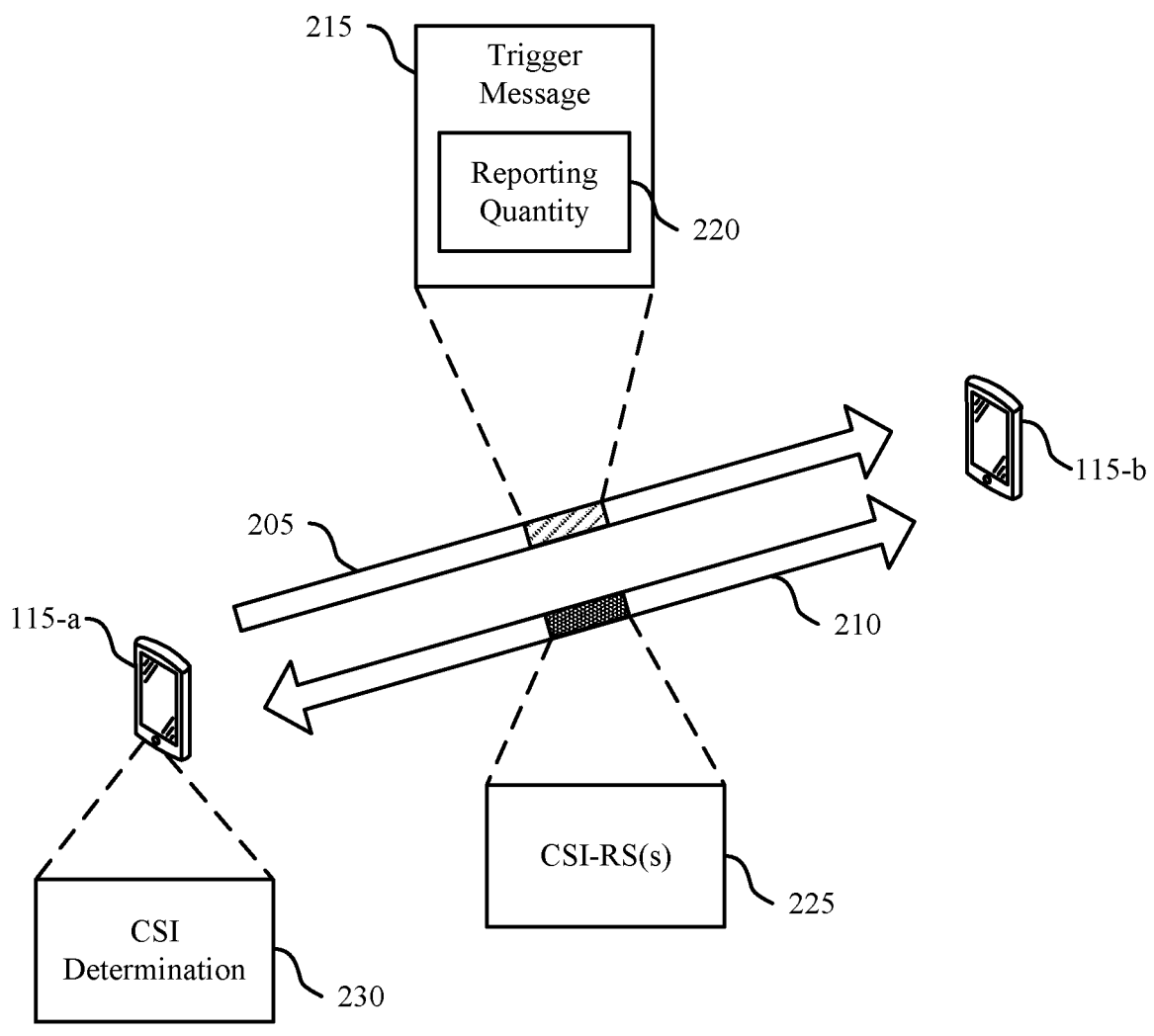
FIG. 2 illustrates an example of a wireless communications system that supports a unified CSI framework for sidelink communications in accordance with aspects of the present disclosure.

FIG. 2 illustrates an example of a wireless communications system 200 that supports unified CSI framework for sidelink communications in accordance with aspects of the present disclosure. Wireless communications system 200 may implement aspects of or may be implemented by aspects of wireless communications system 100. For example, wireless communications system 200 may include a UE 115-*a* and a UE 115-*b*, which may represent examples of UEs 115 as described with reference to FIG. 1. Additionally, UE 115-*a* and UE 115-*b* may communicate on resources of a carrier 205 (e.g., for transmitting control information or configuration information) and of a carrier 210 (e.g., for sidelink communications). Although shown as separate carriers, carrier 205 and carrier 210 may include same or different resources (e.g., time and frequency resources) for the corresponding transmissions.

In some cases, as part of sidelink communications between UE 115-*a* and UE 115-*b*, UE 115-*a* may indicate for UE 115-*b* to perform a CSI reporting or CSI acquisition mode. For example, UE 115-*a* may transmit a CSI request to UE 115-*b* in an SCI message that schedules a sidelink data transmission. UE 115-*a* may then transmit one or more CSI-RSs to UE 115-*b* in a same subchannel of a PSSCH, such that CSI is reported for subchannels that contain the one or more CSI-RSs. UE 115-*b* may then measure the CSI-RSs to determine the CSI and transmit a CSI report back to UE 115-*a* for UE 115-*a* to determine a desired configuration for subsequent transmissions. However, as described with reference to FIG. 1, using this CSI reporting or CSI acquisition mode, CSI-RSs may be transmitted on same subchannels as sidelink data transmissions, so reported CSI may not provide CSI for overall subchannels of interest (e.g., CSIs on subchannels other than the transmitted sidelink data is not obtained), a CSI report may be transmitted after a sidelink data transmission (e.g., such that the sidelink data transmission may be transmitted without the benefit of CSI information), and reciprocal-based CSI reporting may not be supported. As such, enhancements are desired for an improved CSI reporting or CSI acquisition procedure.

Using techniques described herein, wireless communications system 200 may support a unified framework (e.g., unified CSI framework) to support both reciprocal-based and non-reciprocal based CSI reporting for sidelink communications between UE 115-*a* and UE 115-*b*. For example, the unified framework may support antenna switching, PMI-based CSI, a subchannel configuration for CSI reporting, codebooks for PMI-based CSI, among other reporting quantities. Additionally, wireless communications system 200 may support enhancements for CSI reporting content.

For the unified framework, UE 115-*a* may transmit a trigger message 215 to UE 115-*b* (e.g., via carrier 205), where trigger message 215 indicates in part a reporting quantity 220. For example, UE 115-*a* may transmit a CSI report configuration to UE 115-*b* (e.g., via trigger message 215), where the CSI report configuration includes reporting quantity 220 (e.g., antenna switching, RI-CQI, subchannel-selection, PMI-based channel measurements, etc.). That is, trigger message 215 may be a CSI request that triggers a CSI trigger state, where the CSI trigger state includes one or more CSI reports and a report quantity is included in each CSI report configuration. In some cases, trigger message 215 may be a CSI request that triggers a CSI report and the report quantity is included in each CSI report configuration. For example, a trigger state indicated by trigger message 215 may include multiple CSI reports (e.g., a CSI report 1, a CSI report 2, etc.), where each CSI report is performed based on a corresponding CSI report configuration that includes a respective set of parameters, such as a codebook type, a time domain type (e.g., periodic, semi-persistent, aperiodic), a report quantity, a carrier ID (e.g., which carrier that a CSI measurement is to be performed using), etc.

In some examples, trigger message 215 may trigger a CSI report that includes a first CSI reporting mode of a set of CSI reporting modes for a CSI procedure, and reporting quantity 220 may indicate a configuration for the first CSI reporting mode. In some examples, trigger message 215 may include a CSI request that triggers a CSI reporting configuration or multiple CSI reporting configurations. For example, UE 115-*a* may configure multiple CSI reporting configurations for UE 115-*b*, where UE 115-*a* indicates the multiple CSI reporting configurations to UE 115-*b* (e.g., via RRC signaling using a PC5 interface). After configuring the multiple CSI reporting configurations and indicating the configurations to UE 115-*b*, UE 115-*a* may trigger one of the CSI reporting configurations using trigger message 215.

In some examples, the multiple CSI reporting configurations may include different CSI reporting modes, where either UE 115-*a* or UE 115-*b* transmits one or more CSI-RSs 225 (e.g., via carrier 210) based on which CSI reporting mode or CSI reporting configuration is triggered by trigger message 215 (e.g., a CSI request). For example, a first CSI reporting mode (e.g., a mode 1) may include a reciprocal-based CSI acquisition mode, where a destination UE 115 (e.g., UE 115-*b*) transmits the one or more CSI-RSs 225 (e.g., or one or more SRSs for the reciprocal-based CSI acquisition mode) and a source UE 115 (e.g., UE 115-*a*) performs a CSI measurement as part of a CSI determination 230 to determine CSI. Additionally or alternatively, a second CSI reporting mode (e.g., a mode 2) may include a non-reciprocal-based CSI acquisition mode, where the destination UE 115 (e.g., UE 115-*b*) receives the one or more CSI-RSs 225, performs a CSI measurement, and transmits channel state feedback to the source UE 115 indicating the CSI measurement for the source UE 115 to perform CSI determination 230 to determine the CSI. In some examples, trigger message 215 may indicate which CSI reporting mode is triggered. However, each CSI reporting mode may also include multiple (e.g., different) configurations.

Accordingly, reporting quantity 220 (e.g., a reporting mode) may indicate one of the multiple configurations for the triggered CSI reporting mode (e.g., CSI reporting configuration). For example, reporting quantity 220 may include an "antenna switching" reporting quantity, a "subchannel selection" reporting quantity, an "RI-CQI reporting" reporting quantity, an "RI-PMI-CQI reporting" reporting quantity, an "RI-PMI-CQI-subchannel-selection" reporting quantity, or a combination thereof. The "antenna switching" reporting quantity may trigger the first CSI reporting mode (e.g., reciprocal-based CSI acquisition) and is described in more detail with reference to FIG. 6. The "subchannel selection" reporting quantity may trigger a first configuration for the second CSI reporting mode (e.g., non-reciprocal-based CSI acquisition) and is described in greater detail with reference to FIG. 7. The "RI-CQI reporting" reporting quantity, the "RI-PMI-CQI reporting" reporting quantity, and the "RI-PMI-CQI-subchannel-selection" may trigger respective configurations for the second CSI reporting mode (e.g., non-reciprocal-based CSI acquisition) and are described in greater detail with reference to FIG. 8.

For the different configurations for the second CSI reporting mode, UE 115-b (e.g., the destination UE 115) may transmit channel state feedback (e.g., including a CSI report) based on measuring CSI for the one or more CSI-RSs 225 received from UE 115-a. In some examples, a CSI report configuration for the channel state feedback may be associated with (e.g., linked to) one or more CSI-RS resources for channel measurement and an interference measurement resource. The channel measurement may be associated with one resource set or multiple resources. In some implementations, UE 115-a may explicitly configure and indicate the interference measurement resource to UE 115-b, such that UE 115-b can perform explicit channel measurements and interference measurements to report the CSI to UE 115-a (e.g., via a CSI report in the channel state feedback).

Additionally or alternatively, UE 115-a may configure the interference measurement resource implicitly or may configure the interference measurement resource to be the same as the channel measurement resource. If the interference measurement resource and the channel measurement resource are the same, a UE 115 (e.g., UE 115-a, UE 115-b, or both) may measure interference from the channel measurement resource by subtracting channel estimates for the channel measurement resource. For example, if no interference measurement is explicitly configured, the UE 115 may measure interference from the channel measurement resource according to Y=H*s+I+N, where the UE 115 measures the channel (H) and measures the interference plus noise (I+N) after subtracting the estimated channel (H) and a measurement of a pilot (s).

In some examples, as described herein, for the second CSI reporting mode where UE 115-b transmits channel state feedback based on measuring CSI for the one or more CSI-RSs 225 received from UE 115-a, UE 115-b may transmit the channel state feedback using a two-part CSI reporting configuration. For example, the two-part CSI reporting configuration may include a first part and a second part, where the first part includes a fixed payload size and the second part has a payload that is determined based on a reporting content included in the first part. The two-part CSI reporting configuration is described in greater detail with reference to FIG. 9.

Figure 3A:
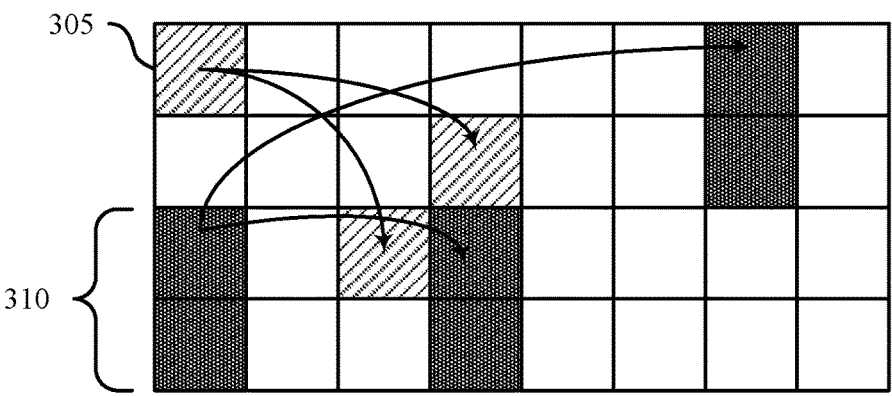
FIGS. 3A and 3B illustrate examples of resource reservations in accordance with aspects of the present disclosure.
Figure 3B:
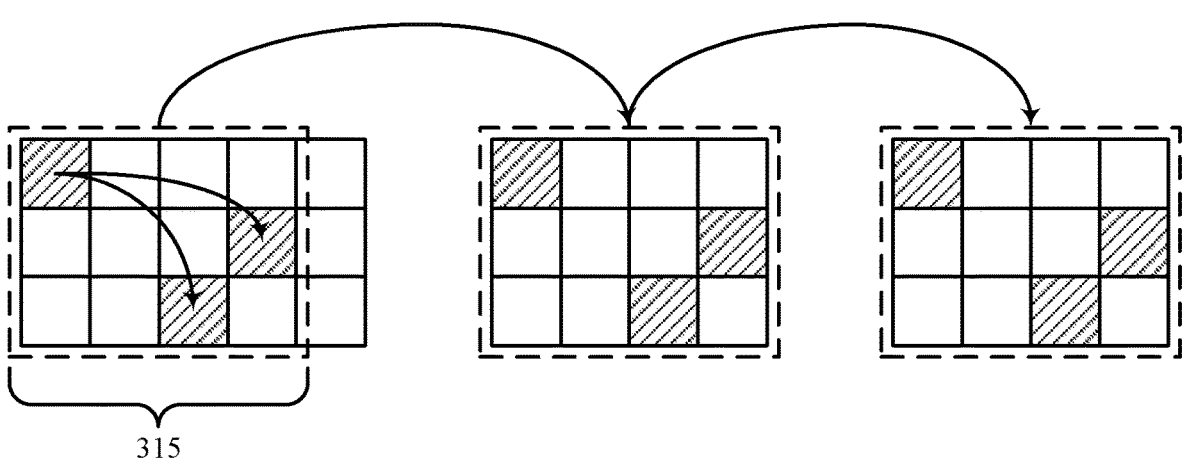

FIGS. 3A and 3B illustrate examples of a resource reservation 300 and a resource reservation 301, respectively, for sidelink communications in accordance with aspects of the present disclosure. Resource reservations 300 and 301 may implement aspects of or may be implemented by aspects of wireless communications system 100, wireless communications system 200, or both. In some examples, two UEs 115 may use resource reservation 300 or resource reservation 301 for sidelink communications. For example, resource reservation 300 or resource reservation 301 may be used by a first UE 115 that reserves the resources to transmit one or more sidelink messages to a second UE 115.

For sidelink communications, when the first UE 115 (e.g., source UE 115, transmitting UE 115, etc.) has data to send to the second UE 115 (e.g., destination UE 115, receiving UE 115, etc.), the first UE 115 may sense available subchannels by decoding SCIs. After decoding SCIs, the first UE 115 may know which subchannels have been reserved by other UEs 115. In some examples, among the subchannels that have been reserved by other UEs 115, the first UE 115 may determine a subset of the subchannels based on which subchannels satisfy a signal measurement threshold (e.g., reference signal received power (RSRP) threshold, reference signal strength indicator (RSSI) threshold, signal-to-noise ratio (SNR) threshold, signal-to-interference-plus-noise ratio (SINR) threshold, etc.). For example, the first UE 115 may consider the subchannels reserved by other UEs exceeding the threshold as unavailable, while others below the threshold as available resource. Subsequently, the first UE 115 may determine and reserve resources randomly from the total subchannels excluding the unavailable subchannels.

As shown in the example of FIG. 3A, the first UE 115 may determine and reserve the resources randomly from the total subchannels excluding the unavailable resources according to resource reservation 300. In some examples, resource reservation 300 may be referred to as an aperiodic resource reservation. According to the aperiodic resource reservation, the first UE 115 may reserve a single subchannel 305 for up to three (3) reservations in the future (e.g., up to three (3) separate resources or subchannels reserved) or may reserve a set of subchannels 310 for up to three (3) reservations in the future. For example, the first UE 115 may reserve the set of subchannels 310 if the first UE 115 determines additional resources are needed for the upcoming sidelink transmission or additional resources may be needed for retransmission. The first UE 115 may use the reservations of the single subchannel 305 or the set of subchannels 310 to transmit sidelink information (e.g., sidelink data, sidelink configuration information, etc.) to the second UE 115. The first UE 115 may use resource reservation 300 for aperiodic sidelink transmissions to the second UE 115, such as a single sidelink transmission to the second UE 115.

Additionally or alternatively, as shown in the example of FIG. 3B, the first UE 115 may determine and reserve resources randomly from the total subchannels excluding the unavailable resources according to resource reservation 301. In some examples, resource reservation 301 may be referred to as a periodic resource reservation. According to the periodic resource reservation, the first UE 115 may reserve a subchannel pattern 315 (e.g., shown as up to three (3) subchannels but may include more or fewer subchannels) for multiple instances in time (e.g., periodically). That is, using resource reservation, the first UE 115 may reserve resources randomly such that the reserved resources (e.g., reserved subchannels) appear periodically. The first UE 115 may use resource reservation 300 for periodic sidelink transmissions to the second UE 115, such as multiple sidelink transmissions to the second UE 115 that are sent periodically by the first UE 115.

However, using resource reservation 300 or resource reservation 301 may rely on the first UE 115 randomly selecting resources or subchannels. As such, the first UE 115 may not reserve the most optimal resources from the determined available subchannels or subset of the available subchannels. In some implementations, the first UE 115 may trigger a CSI acquisition procedure to obtain CSI to determine optimal resources for the upcoming sidelink transmission(s), to determine transmission parameters for the upcoming sidelink transmission(s), or both. However, as described previously with reference to FIGS. 1 and 2, some CSI acquisition procedures may be deficient.

Figure 4:
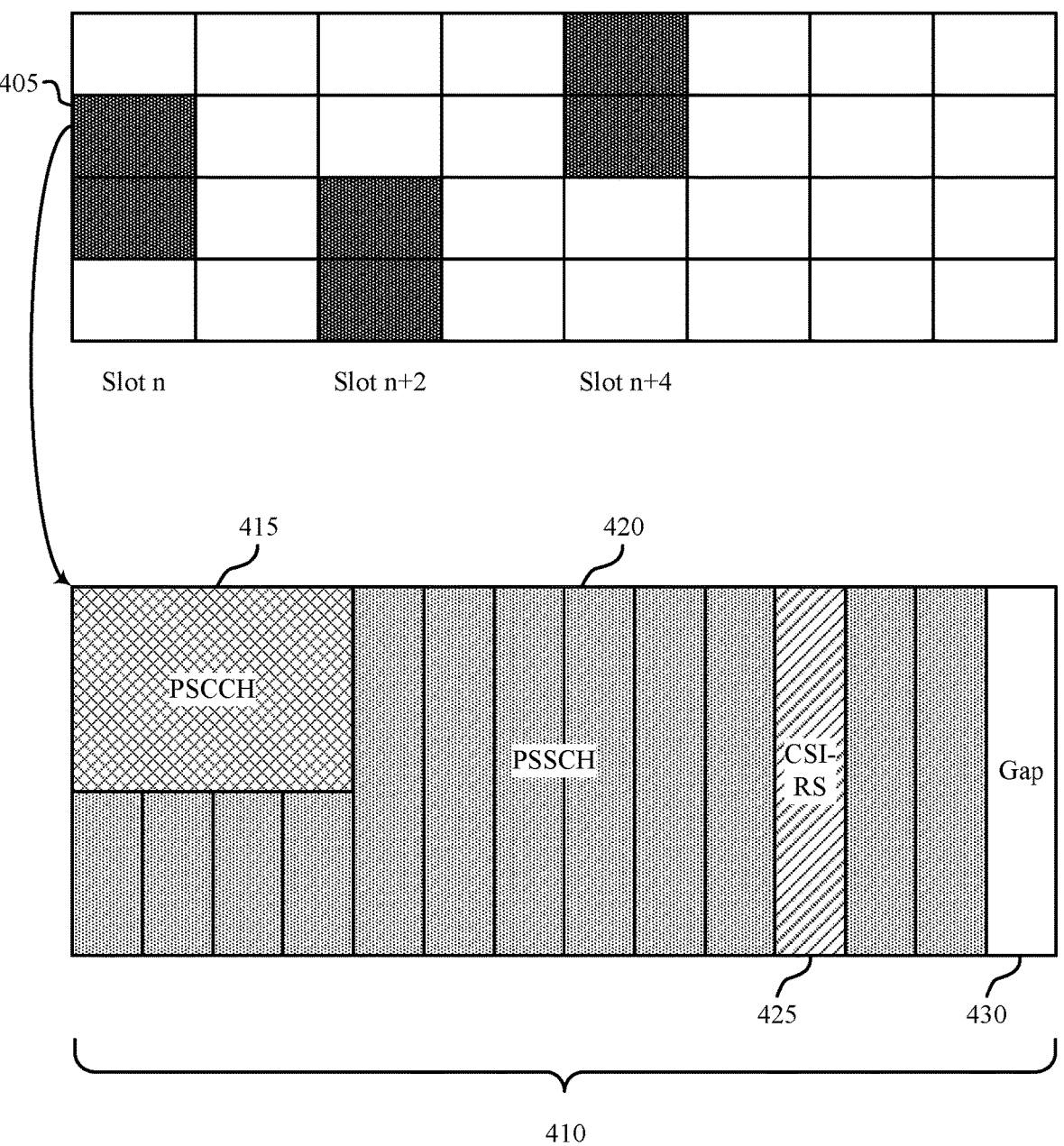
FIG. 4 illustrates an example of a sidelink CSI reference signal (RS) configuration in accordance with aspects of the present disclosure.

FIG. 4 illustrates an example of a CSI-RS configuration 400 for sidelink communications in accordance with aspects of the present disclosure. CSI-RS configuration 400 may implement aspects of or may be implemented by aspects of wireless communications system 100, wireless communications system 200, or both. For example, two UEs 115 may use CSI-RS configuration 400 to support sidelink communications between each other. In some examples, a first UE 115 may trigger a CSI acquisition with a second UE 115, where the first UE 115 transmits a CSI-RS to the second UE 115 according to CSI-RS configuration 400. Subsequently, the second UE 115 may receive the CSI-RS, perform a CSI measurement, and then transmit channel state feedback to the first UE 115 to indicate the CSI measurement. Based on the channel state feedback, the first UE 115 may obtain CSI for a subchannel to then determine a configuration or parameters for transmitting subsequent sidelink messages to the second UE 115 on that subchannel.

In some examples, when triggering the CSI acquisition, the first UE 115 may transmit a CSI request in an SCI that schedules a data transmission (e.g., sidelink data transmission). For example, the first UE 115 may reserve one or more subchannels 405 according to a resource reservation configuration as described with reference to FIG. 3 (e.g., up to three (3) subchannel reservations aperiodically or a pattern of subchannels reserved periodically). Accordingly, when transmitting the data transmission on a first reserved set of subchannels, the first UE 115 may use a slot 410 that includes a physical sidelink control channel (PSCCH) 415 (e.g., to indicate configuration information for the data transmission), a physical sidelink shared channel (PSSCH) 420 (e.g., to carry the data transmission along with any other information for the data transmission), a CSI-RS 425 (e.g., for the CSI acquisition), and a gap 430 (e.g., to provide a buffer between sidelink communications using slot 410 and a subsequent sidelink transmission in that same subchannel).

In some examples, PSCCH 415 may, in part, carry a first stage SCI (SCI-1) containing control information, and PSSCH 420 may, in part, carry a second stage SCI (SCI-2) containing additional control information. The PSSCH 420, may, in part, also carry data transmission(s) (e.g., sidelink data transmission(s)). Additionally or alternatively, if the first UE 115 reserves two subchannels consecutive in the frequency domain, a first subchannel of the two subchannels may look like slot 410, while a second subchannel of the two subchannels may not include a PSCCH (e.g., because there is no need of SCI as the SCI is included in the first subchannel).

As shown, the first UE 115 may transmit CSI-RS 425 in the same subchannel as PSSCH 420. Based on CSI-RS 425 being in the same subchannel as PSSCH 420, the second UE 115 may measure and report CSI (e.g., via the channel state feedback) for the subchannel(s) that contain CSI-RS 425 alone. Accordingly, the CSI reported by the second UE 115 in the channel state feedback may include CSI for the subchannels in a slot n but may not include CSI for the subchannels in a slot n+2 or a slot n+4 (e.g., subsequent resource reservations of a same reservation) because the subchannels in slot n+2 and n+4 may be different compared to subchannels in slot n, so the CSI reported using CSI-RS in slot n may not be used for slot n+2 and n+4. In some examples, the second UE 115 may report the CSI (e.g., an RI for the subchannel, a CQI for the subchannel, or both) via a MAC control element (CE).

However, as discussed previously with reference to FIGS. 1 and 2, when CSI-RS 425 is transmitted on same subchannel(s) as a sidelink data transmission (e.g., carried via PSSCH 420), CSI-RS 425 may be used to determine CSI on the subchannels with which the scheduled data is transmitted rather than additional subchannels of interest (e.g., such as additional resources reserved in a same reservation as the subchannel carrying the SCI with CSI-RS 425). Additionally, the first UE 115 may transmit CSI-RS 425 with or after the sidelink data transmission, such that the sidelink data transmission may be transmitted without the benefit of CSI information on the subchannel(s) prior to the sidelink data transmission.

Figures 5A, 5B:
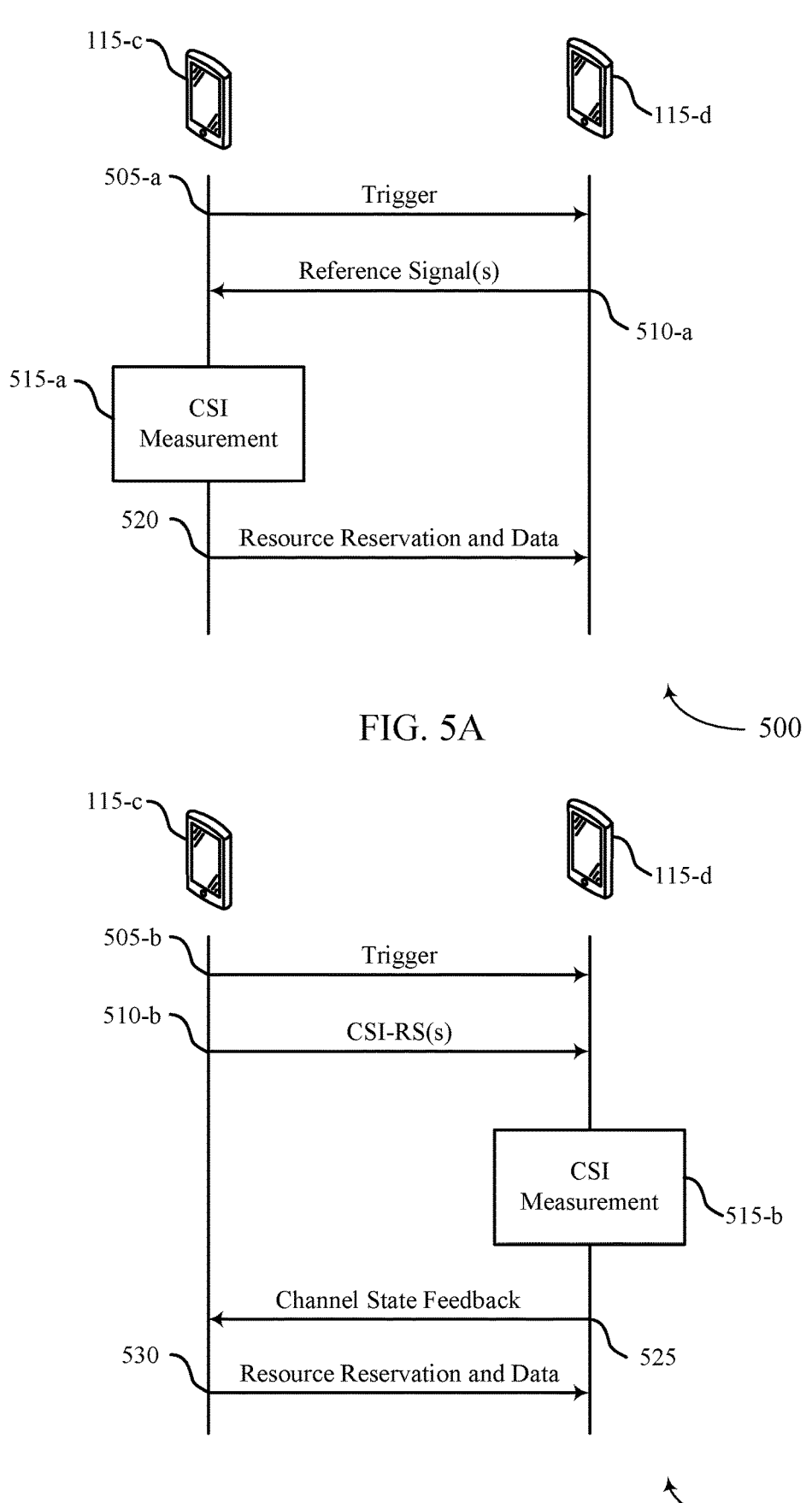
FIGS. 5A and 5B illustrate examples of CSI acquisitions in accordance with aspects of the present disclosure.

FIGS. 5A and 5B illustrate examples of a CSI acquisition 500 and a CSI acquisition 501, respectively, for sidelink communications in accordance with aspects of the present disclosure. CSI acquisition 500 and a CSI acquisition 501 may implement aspects of or may be implemented by aspects of wireless communications system 100, wireless communications system 200, or both. For example, CSI acquisition 500 and CSI acquisition 501 may include a UE 115-c and a UE 115-d, which may represent examples of UEs 115 as described with reference to FIGS. 1-4. UE 115-c and UE 115-d may use CSI acquisition 500, CSI acquisition 501, or both to support sidelink communications between each other. For example, UE 115-c and UE 115-d may use CSI acquisition 500 or CSI acquisition 501 for UE 115-c to obtain CSI for determining a configuration or parameters for transmitting subsequent sidelink messages to UE 115-d.

In some examples, CSI acquisition 500 may represent a reciprocal-based CSI acquisition procedure, and CSI acquisition 501 may represent a non-reciprocal-based CSI acquisition. As described previously with reference to FIGS. 1 and 2, some CSI procedures may not support reciprocal-based CSI acquisition. The techniques described herein may support reciprocal-based CSI acquisition and non-reciprocal-based CSI acquisition under a unified CSI framework.

As shown in FIG. 5A, CSI acquisition 500 may begin with UE 115-c transmitting a trigger (e.g., a CSI request) to UE 115-d at 505-a. In some examples, the trigger may be SCI or sequence based. Additionally, the trigger may initiate a reciprocal-based CSI acquisition procedure (e.g., a CSI reporting mode 1, where a source UE 115, such as UE 115-c, performs a CSI measurement based on CSI-RS(s) transmitted by a destination UE 115, such as UE 115-d). For example, the trigger may indicate for UE 115-d to transmit one or more reference signals according to a configuration (e.g., a CSI configuration) or a reporting mode (e.g., a CSI reporting mode) indicated by the trigger. At 510-a, based on receiving the trigger for the reciprocal-based CSI acquisition procedure, UE 115-d may transmit one or more reference signals to UE 115-c. For example, the reference signals may include one or more CSI-RSs, one or more SRSs, or another reference signal for measuring channel characteristics. At 515-a, UE 115-c may perform a CSI measurement based on receiving the one or more reference signals from UE 115-d. At 520, UE 115-c may reserve resources based on the CSI measurement and may transmit a sidelink data transmission to UE 115-d using the reserved resources. Additionally, UE 115-c may determine a configuration or parameters for transmitting the sidelink data transmission based on the CSI measurement. As described herein and with reference to FIG. 2, when transmitting the trigger at 505-a, UE 115-c may include a reporting quantity for the triggered CSI acquisition procedure, where the reporting quantity indicates that the triggered CSI acquisition procedure is reciprocal-based. For example, the reporting quantity may be set to "antenna switching," where UE 115-*d* is triggered to transmit the one or more reference signals at 510-*a* based on the reporting quantity being set to "antenna switching."

Additionally or alternatively, as shown in FIG. 5B, CSI acquisition 510 may also begin with UE 115-*c* transmitting a trigger to UE 115-*d* at 505-*b*. However, unlike FIG. 5A, the trigger transmitted at 510-*b* may initiate a non-reciprocal-based CSI acquisition procedure (e.g., a CSI reporting mode 2, where a destination UE 115, such as UE 115-*d*, performs a CSI measurement and transmits channel state feedback). For example, the trigger may indicate that UE 115-*c* will subsequently transmit one or more CSI-RSs according to a CSI configuration or CSI reporting mode indicated by the trigger. At 510-*b*, based on transmitting the trigger for the non-reciprocal-based CSI acquisition procedure, UE 115-*c* may transmit one or more CSI-RSs to UE 115-*d*. At 515-*b*, UE 115-*d* may perform a CSI measurement based on receiving the one or more CSI-RSs from UE 115-*c*. At 525, UE 115-*d* may transmit channel state feedback (e.g., on a reserved long physical sidelink feedback channel (PSFCH) or via a MAC-CE transmitted on a PSSCH to be reserved by UE 115-*d* when the CSI report is ready) to UE 115-*c* to indicate the CSI measurement (e.g., a CSI report) performed on the one or more CSI-RSs. At 530, based on the received channel state feedback with the CSI measurement, UE 115-*c* may reserve resources based on the CSI measurement and may transmit a sidelink data transmission to UE 115-*d* using the reserved resources. Additionally, UE 115-*c* may determine a configuration or parameters for transmitting the sidelink data transmission based on the CSI measurement.

UE 115-*c* may transmit one or more CSI report configurations to UE 115-*d* via RRC, where each CSI report may comprise one or more parameters, such as a report quantity, a time domain type (e.g., periodic, semi-periodic, or aperiodic), a codebook, etc. In some cases, UE 115-*c* may further transmit a CSI report trigger state configuration to UE 115-*d*, where each trigger state may include one or more CSI reports. As described in FIG. 2, UE 115-*c* may transmit a trigger message (e.g., a CSI request) to trigger a CSI report or a CSI trigger state that includes one or more CSI reports. Based on the triggered CSI report or CSI trigger state, UE 115-*c* and UE 115-*d* may know whether to transmit or receive a CSI-RS based on a report quantity for the CSI report or the CSI trigger state, where the report quantity implicitly indicates the CSI reporting mode (e.g., reciprocal based or non-reciprocal based). In some implementations, the reporting quantity may implicitly indicate that the triggered CSI acquisition procedure is non-reciprocal-based. For example, the reporting quantity may be set to a different quantity than "antenna switching" (e.g., "subchannel selection," "RI-CQI reporting," "RI-PMI-CQI reporting," "RI-CQI-subchannel-selection," "RI-PMI-CQI-subchannel-selection," etc.), where UE 115-*d* is triggered to monitor for and receive the one or more CSI-RSs at 510-*b* from UE 115-*c* based on the reporting quantity being set to a different quantity than "antenna switching."

FIG. 6 illustrates an example of an antenna switching CSI report configuration 600 that supports unified CSI framework for sidelink communications in accordance with aspects of the present disclosure. Antenna switching CSI report configuration 600 may implement aspects of or may be implemented by aspects of wireless communications system 100, wireless communications system 200, or both. For example, a first UE 115 (e.g., a source UE 115, a transmitting UE 115, etc.) may trigger a CSI report configuration for a second UE 115 (e.g., destination UE 115, receiving UE 115, etc.), such as by transmitting a CSI request (e.g., trigger message) to the second UE 115 (e.g., indicating for the second UE 115 to transmit one or more CSI-RSs/SRSs or for the second UE 115 to perform a CSI reporting). In the example of FIG. 6, the CSI reporting configuration may include a reciprocal-based CSI acquisition procedure (e.g., a CSI reporting mode 1) by setting the report quantity being "antenna switching" as described with reference to FIG. 2. For example, the reporting quantity may be configured as part of a corresponding CSI report configuration (e.g., via RRC). Then a particular CSI report or multiple CSI reports may be triggered via the CSI request (e.g., the trigger or trigger message).

For example, based on the "antenna switching" reporting quantity, if triggered, the second UE 115 may transmit a reference signal (e.g., one or more CSI-RSs, one or more SRSs, etc.) to the first UE 115 instead of the second UE 115 receiving a CSI-RS from the first UE 115 and transmitting CSI reporting for the received CSI-RS. Subsequently, the first UE 115 may receive the reference signal from the second UE 115 and may perform a channel measurement (e.g., CSI measurement) rather than receiving the CSI measurement from the second UE (e.g., in channel state feedback, such as a CSI report). In some examples, the first UE 115 may configure multiple reference signal resource/resource-set configurations for reciprocal-based CSI acquisition procedures and indicate the multiple configurations to the second UE 115 (e.g., via PC5 RRC signaling). For example, each configuration of the multiple reference resource/resource-set configurations may include resources (e.g., time resources, frequency resources, both) for the second UE 115 to transmit the reference signal, a reference signal pattern for the second UE 115 to transmit the reference signal, a number of ports for the second UE 115 to transmit the reference signal, and additional parameters or information to enable the reference signal transmission from the second UE 115. Accordingly, when transmitting the trigger for the CSI report configuration with the "antenna switching" reporting quantity included, the first UE 115 may indicate which configuration of the multiple reference signal resource/resource-set configurations for reciprocal-based CSI acquisition procedures is to be used. Additionally or alternatively, one configuration of the CSI-RS associated to the CSI report may be configured (regardless of the report quantity being "antenna switching" for reciprocal based CSI acquisition or being other values for non-reciprocal based CSI acquisition). In such examples, each CSI report may be configured with one CSI-RS resource or one CSI-RS resource set configuration, such that there is no need of extra signaling to indicate which resource or resource-set is to be used.

In some implementations, the first UE 115 may determine and signal the indicated configuration (e.g., an associated reference signal or CSI-RS configuration) for the CSI report configuration based on an antenna switching capability of the second UE 115 (e.g., the indicated configuration satisfies a capability of the second UE 115 for antenna switching of 'x' transmit antennas and 'y' receive antennas, which may be given by xTyR). For example, the second UE 115 may transmit a UE capability report to the first UE 115 when establishing a sidelink connection with the first UE 115, where the UE capability report indicates the antenna switching capability, a number of transmit antennas (x) for the second UE 115, a number of receive antennas (y) for the second UE 115, or a combination thereof. If the number of transmit antennas is equal to the number of receive antennas (e.g., x=y), the first UE 115 may indicate any of the multiple configurations for reciprocal-based CSI acquisition procedures (e.g., any CSI-RS pattern can be triggered for the second UE 115 to transmit the CSI-RS). If the number of transmit antennas is less than the number of receive antennas (e.g., x<y), a proportion of the number of receive antennas to the number of transmit antennas (e.g., n=y/x, where n represents the proportion and may be referred to as a multiplying factor) may correspond to a number of reference signal resources for the second UE 115 to transmit the reference signal on different symbols or on a single resource with TDMed ports on different symbols. For example, based on the UE capability report, the first UE 115 may determine the number of receive antennas is n times the number of transmit antennas (e.g., n=y/x, such that y=n*x where n represents a multiplying factor for the number of receive antennas, y, in relation to the number of transmit antennas, x).

In some examples, the second UE 115 may transmit the CSI-RS from at most x ports (e.g., CSI-RS ports) at a time (e.g., corresponding to the number of transmit antennas, x). Additionally, to support the first UE 115 estimating channels associated to all of the y receive antennas of the second UE 115, at least n symbols (e.g., corresponding to the proportion or multiplying factor, n) may be needed for the second UE 115 to transmit the CSI-RS, where the CSI-RS ports transmitted on different symbols may be from different antenna ports. To achieve the n symbol pattern, the second UE 115 may transmit the CSI-RS on n resources with each resource having x ports, and each resource may be located on a particular symbol. Additionally or alternatively, the second UE 115 may transmit the CSI-RS on a single resource with a total of y ports and transmitted n symbols, where each symbol carries x ports.

As shown in the example of FIG. 6, the second UE 115 may include four (4) antennas 605 (e.g., indicated via a UE capability report for the second UE 115), such as a first antenna 605-*a*, a second antenna 605-*b*, a third antenna 605-*c*, and a fourth antenna 605-*d* (e.g., four (4) ports). In some examples, the second UE 115 may use the four (4) antennas 605 to receive signals simultaneously (e.g., 4R), but the second UE 115 may only use two (2) of the antennas 605 to transmit signals simultaneously (e.g., 2T) based on there being two (2) transmit chains. For example, at a first symbol, a first transmit chain (e.g., transmit chain 0) and a second transmit chain (e.g., transmit chain 1) may switch to first antenna 605-*a* and second antenna 605-*b*, respectively, such that the second UE 115 transmits two (2) CSI-RS ports for the first UE 115 to measure the channel associated to first antenna 605-*a* and second antenna 605-*b*. Subsequently, at a second symbol, the first transmit chain and the second transmit chain may switch to third antenna 605-*c* and fourth antenna 605-*d*, respectively, such that the second UE 115 transmits another two (2) CSI-RS ports for the first UE 115 to measure the channel associated to third antenna 605-*c* and fourth antenna 605-*d*.

In some examples, based on the second UE 115 being able to switch antennas quickly (e.g., as indicated via the UE capability report for the second UE 115), the first UE 115 may configure the second UE 115 to transmit the reference signal using resources 610 and resources 615 (e.g., resource elements (REs)). Resources 610 and resources 615 may include one or more resource elements 620 that correspond to a respective symbol period 625 (e.g., time resources) and a subcarrier 630 (e.g., frequency resources). Additionally, resources 610 may carry the reference signal as transmitted by the second UE 115 via first antenna 605-*a* and second antenna 605-*b*, while resources 615 may carry the reference signal as transmitted by the second UE 115 via third antenna 605-*c* and fourth antenna 605-*d*. In some examples, resources 610 and resources 615 may be two (e.g., separate) resources, each on a particular subcarrier 630, and the CSI-RS ports transmitted in different resources may be through different antenna ports. Additionally or alternatively, resources 610 and resources 615 may be a same resource with multiple symbols (e.g., considered a single resource with four (4) ports), were the CSI-RS ports are transmitted through different ports. For each option and for the ports transmitted on a same symbol, the second UE 115 may use code division multiplexing (CDM) to multiplex the ports. and two (2) code division multiplexing (CDM) groups (e.g., a single resource with different symbol locations for each port).

In some examples, the second UE 115 may use two (2) CDM groups to transmit ports on a same symbol. For example, the second UE 115 may, on the first symbol, transmit the reference signal using a first CDM group that includes the reference signal transmission via first antenna 605-*a* and second antenna 605-*b* on a first symbol of the single resource (e.g., a fourth symbol or symbol 3 as shown in the example of FIG. 6) and may, on the second symbol, transmit the reference signal using a second CDM group that includes the reference signal transmission via third antenna 605-*c* and fourth antenna 605-*d* is transmitted on a second symbol of the single resource (e.g., a fifth symbol or symbol 4 as shown in the example of FIG. 6).

Additionally or alternatively, if the second UE 115 is unable to switch antennas quickly (e.g., as indicated via the UE capability report for the second UE 115), the first UE 115 may configure the second UE 115 to transmit the reference signal using resources 635 and resources 640 that includes a gap in time between the resources (e.g., to give the second UE 115 time to switch transmit antennas). Similar to resources 610 and resources 615, resources 635 and resources 640 may include one or more resource elements 620 that correspond to the respective symbol period 625 (e.g., time resources) and the subcarrier 630 (e.g., frequency resources). Resources 635 may be considered a first resource with two (2) ports, and resources 640 may be considered a second resource with two (2) ports as well, resulting in the second UE 115 transmitting the reference signal across a total of four (4) ports. For example, the second UE 115 may transmit the reference signal using a first CDM group that includes the reference signal transmission via first antenna 605-*a* and second antenna 605-*b* on a first symbol for the first resource (e.g., a fourth symbol or symbol 3 as shown in the example of FIG. 6) and may transmit the reference signal using a second CDM group that includes the reference signal transmission via third antenna 605-*c* and fourth antenna 605-*d* on a second symbol for the second resource (e.g., a sixth symbol or symbol 5 as shown in the example of FIG. 6).

In some examples, where the number of receive antennas for the second UE 115 is given by n=y/x (e.g., n represents a multiplying factor such that the number of receive antennas is greater than the number of transmit antennas by a factor of n) as indicated in the UE capability report from the second UE 115, the first UE 115 may determine that the reference signal configuration (e.g., for the second UE 115 to transmit the reference signal) includes n symbols, where the reference signal ports transmitted on a first symbol of the n symbols is associated to a different set antenna ports of the second UE 115 than the reference signal ports transmitted on a second symbol of the n symbols. In some examples, the reference signal configuration may include n resources, and the second UE 115 may transmit each resource of the n resources on a particular symbol such that reference signal ports transmitted in a first resource is associated to a different set of antenna ports of the second UE 115 than the reference signal ports transmitted in a second resource. Additionally or alternatively, the reference signal configuration may include a single resource with n different symbol locations.

While two configurations (e.g., CSI patterns) for the second UE 115 to transmit the reference signal are shown in the example of FIG. 6, the first UE 115 may configure and indicate additional configurations for the second UE 115 to transmit the reference signal. For example, the first UE 115 may configure a respective resource for each reference signal transmission via a corresponding transmit antenna 605. Additionally, the first UE 115 may configure each resource on a particular symbol. In some examples, reference signal ports transmitted in a first resource may be associated to a different set of antenna ports of the second UE 115 than reference signal ports transmitted in a second resource. For example, under a reciprocal-based CSI mode, the first UE 115 may interpret CSI associated to each antenna port is transmitted from an antenna at the second UE 115, which may be used to receive subsequent signals transmitted from the first UE 115. Based on receiving the reference signal from the second UE 115, the first UE 115 may determine a CSI measurement that includes a first CSI measurement of the reference signal transmitted via a first antenna port of multiple antenna ports of the second UE 115 and a second CSI measurement of the reference signal transmitted via a second antenna port of the multiple antenna ports of the second UE 115.

FIG. 7 illustrates an example of a subchannel selection CSI report configuration 700 that supports unified CSI framework for sidelink communications in accordance with aspects of the present disclosure. Subchannel selection CSI report configuration 700 may implement aspects of or may be implemented by aspects of wireless communications system 100, wireless communications system 200, or both. For example, a first UE 115 (e.g., a source UE 115, a transmitting UE 115, etc.) may trigger a CSI report for a second UE 115 (e.g., destination UE 115, receiving UE 115, etc.), such as by transmitting a CSI request (e.g., trigger message) to the second UE 115 (e.g., the triggered CSI report has a report quantity "subchannel-selection," and the first UE 115 transmits one or more CSI-RSs or the second UE 115 performs a CSI reporting based on the triggered CSI report). In the example of FIG. 7, the triggered CSI report may include a non-reciprocal-based CSI acquisition procedure (e.g., a CSI reporting mode 2) by setting report quantity to some particular values. Additionally, as described with reference to FIG. 2, the triggered CSI report may include a "subchannel selection" reporting quantity, where the "subchannel selection" reporting quantity corresponds to a configuration for the non-reciprocal-based CSI acquisition procedure (e.g., the first UE 115 transmitting a CSI-RS to the second UE 115).

In some examples, the first UE 115 may configure multiple reference signal resource/resource-set configurations for non-reciprocal-based CSI acquisition procedures and indicate the multiple configurations to the second UE 115 (e.g., via PC5 RRC signaling). For example, each configuration of the multiple reference resource/resource-set configurations may include parameters or information to enable the reference signal reception at the second UE 115 (e.g., resources used to transmit/receive the reference signal). Accordingly, when transmitting the trigger for the CSI report configuration with the "subchannel selection" reporting quantity included, the first UE 115 may indicate which configuration of the multiple reference signal resource/resource-set configurations for non-reciprocal-based CSI acquisition procedures is to be used. Additionally or alternatively, one configuration of the CSI-RS associated to the CSI report may be configured (regardless of the report quantity being "subchannel selection" for non-reciprocal based CSI acquisition, being other values for non-reciprocal based CSI acquisition, or for reciprocal-based CSI acquisition). In such examples, each CSI report may be configured with one CSI-RS resource or one CSI-RS resource set configuration, such that there is no need of extra signaling to indicate which resource or resource-set is to be used.

Based on the "subchannel selection" reporting quantity, if triggered, the first UE 115 may transmit one or more CSI-RSs 705 to the second UE 115 in each of a set of subchannels (e.g., from a first subchannel (subchannel 1) to an N-th subchannel (subchannel N)). In some examples, the first UE 115 may transmit a CSI-RS on every one or more RB of each subchannel (e.g., transmitting the CSI-RS on every RB may correspond to a CSI-RS density 1, transmitting the CSI-RS on every two (2) RBs may correspond to a CSI-RS density 0.5, etc.). On each RB, the CSI-RS may occupy multiple REs. As shown, the CSI-RS 705 may be located in same location in each RB across all RBs. Subsequently, when performing a CSI measurement on the CSI-RSs 705, the second UE 115 may further select a set of preferred subchannels based on corresponding measurements of the CSI-RSs 7-5 for each subchannel. Subsequently, when transmitting channel state feedback for the performed CSI measurement, the second UE 115 may indicate selected subchannels 710 to the first UE 115, where the first UE 115 may use one or more of the selected subchannels 710 for transmitting subsequent sidelink messages to the second UE 115.

In some examples, the second UE 115 may determine the selected subchannels 710 based on a signal measurement of respective CSI-RSs 705 in each of the subchannels. For example, if the signal measurement of a CSI-RS 705 for a subchannel satisfies a threshold value (e.g., the signal measurement is above the threshold value, is equal to the threshold value, or is less than the threshold value), the second UE 115 may determine the corresponding subchannel is a preferred subchannel. In some implementations, the signal measurement may include an RSRP, an SNR, an SINR, or a spectral efficiency (SE) measurement, where satisfying the threshold value may correspond to exceeding the threshold value. Additionally, the threshold value may be configured via higher layer signaling (e.g., control signaling, RRC signaling, etc.), may be indicated by a network device, may be indicated by the first UE 115 (e.g., via PC5 RRC signaling), or may be predefined.

In some implementations, as shown in the example of FIG. 7, the second UE 115 may indicate the selected subchannels 710 as a selection of M consecutive subchannels out of N total subchannels. Accordingly, there may be N−M+1 possibilities for the selected subchannels 710, where the second UE 115 indicates a starting subchannel using a (N−M+1) bitmap or using $\log_2(N-M+1)$ bits explicitly. In some examples, M may be configured by the first UE 115 (e.g., via PC5 RRC signaling) or by a higher layer (e.g., control signaling).

Additionally or alternatively, the second UE 115 may indicate the selected subchannels 719 as a free selection of M subchannels out of N total subchannels. Accordingly, there may be $$\binom{N}{M}$$

possibilities for the selected subchannels 710, where the second UE 115 indicates the selected subchannels 710 using an N bitmap or using $\log_2$ $$\binom{N}{M}$$

bits explicitly. In some examples, M may be configured by the first UE 115 (e.g., via PC5 RRC signaling) or by a higher layer (e.g., control signaling).

FIG. 8 illustrates an example of a reporting configuration 800 that supports unified CSI framework for sidelink communications in accordance with aspects of the present disclosure. Reporting configuration 800 may implement aspects of or may be implemented by aspects of wireless communications system 100, wireless communications system 200, or both. For example, a first UE 115 (e.g., a source UE 115, a transmitting UE 115, etc.) may trigger a CSI report for a second UE 115 (e.g., destination UE 115, receiving UE 115, etc.), such as by transmitting a CSI request (e.g., trigger message) to the second UE 115 (e.g., the triggered CSI report has an "RI-CQI reporting" reporting quantity, an "RI-CQI-subchannel-selection" reporting quantity, an "RI-PMI-CQI reporting" reporting quantity, or an "RI-PMI-CQI-subchannel-selection" reporting quantity, and the first UE 115 transmits one or more CSI-RSs or the second UE 115 performs a CSI reporting based on the triggered CSI report). In the example of FIG. 8, the CSI reporting configuration may include a non-reciprocal-based CSI acquisition procedure (e.g., a CSI reporting mode 2). Additionally, as described with reference to FIG. 2, the triggered CSI report may include an "RI-CQI reporting" reporting quantity, an "RI-CQI-subchannel-selection" reporting quantity, an "RI-PMI-CQI reporting" reporting quantity, or an "RI-PMI-CQI-subchannel-selection" reporting quantity, where one of these reporting quantities corresponds to a configuration for the non-reciprocal-based CSI acquisition procedure (e.g., the first UE 115 transmitting a CSI-RS to the second UE 115).

In some examples, as described with reference to FIG. 7, the first UE 115 may configure multiple reference signal resource/resource-set configurations for non-reciprocal-based CSI acquisition procedures and indicate the multiple configurations to the second UE 115 (e.g., via PC5 RRC signaling). For example, each configuration of the multiple reference resource/resource-set configurations may include parameters or information to enable the reference signal reception at the second UE 115 (e.g., resources used to transmit/receive the reference signal). Accordingly, when transmitting the trigger for the CSI report configuration with the "subchannel selection" reporting quantity included, the first UE 115 may indicate which configuration of the multiple reference signal resource/resource-set configurations for non-reciprocal-based CSI acquisition procedures is to be used. Additionally or alternatively, one configuration of the CSI-RS associated to the CSI report may be configured (regardless of the report quantity being "subchannel selection" for non-reciprocal based CSI acquisition, being other values for non-reciprocal based CSI acquisition, or for reciprocal-based CSI acquisition). In such examples, each CSI report may be configured with one CSI-RS resource or one CSI-RS resource set configuration, such that there is no need of extra signaling to indicate which resource or resource-set is to be used.

Based on the "RI-CQI reporting" reporting quantity, if triggered, the first UE 115 may transmit one or more CSI-RSs 805 to the second UE 115 in each of a set of subchannels (e.g., from a first subchannel (subchannel 1) to an N-th subchannel (subchannel N)). In some examples, the first UE 115 may transmit a CSI-RS on every one or more RB of each subchannel (e.g., transmitting the CSI-RS on every RB may correspond to a CSI-RS density 1, transmitting the CSI-RS on every two (2) RBs may correspond to a CSI-RS density 0.5, etc.). On each RB, the CSI-RS may occupy multiple REs. As shown, the CSI-RS 805 may be located in same location in each RB across all RBs. Subsequently, when performing a CSI measurement on the CSI-RSs 805, the second UE 115 may determine an RI 815 or one or more CQIs 825 or both for the N subchannels. When transmitting channel state feedback for the CSI measurement, the second UE 115 may then include RI reporting that indicates a selection of RI ports from a total of P ports, where each selected port corresponds to a layer. For each value of RI, the selected RI ports may be configured by the first UE 115 (e.g., via PC5 RRC signaling) or may be reported by the second UE 115 (e.g., in the channel state feedback).

Additionally or alternatively, for the "RI-PMI-CQI reporting" reporting quantity or the "RI-PMI-CQI-subchannel-selection" reporting quantity (e.g., PMI-based channel quality reporting), or both, if triggered, the first UE 115 may transmit the one or more CSI-RSs 805 to the second UE 115 in each of the set of subchannels. However, unlike the "RI-CQI reporting" reporting quantity, the second UE 115 may further determine one or more PMIs 820 in addition to or alternative to the RI 815 and the one or more CQIs 825 for the N subchannels (e.g., or for a subset of the N subchannels, such as selected subchannels 810, if the "RI-PMI-CQI-subchannel-selection" reporting quantity is triggered or indicated). Subsequently, when transmitting channel state feedback for the CSI measurement based on the "RI-PMI-CQI reporting" reporting quantity or the "RI-PMI-CQI-subchannel-selection" reporting quantity, the second UE 115 may use a codebook of a set of codebooks for PMI based reporting to indicate the RI 815, the one or more PMIs 820, the one or more CQIs 825, or a combination thereof. For example, the set of codebooks may include an uplink codebook for coherent transmissions, an uplink codebook for partial coherent transmissions, an uplink codebook for non-coherent transmissions, a codebook for full power uplink transmissions, a codebook for a first type of single panel (e.g., Type 1 single panel), a codebook for multi-panels, a high resolution codebook for port/beam-selection/combination and per-coefficient quantization (e.g., as Type II codebook, Type II port-selection codebook, enhanced Type II codebook, enhanced Type II port-selection codebook), or a combination thereof.

For the "RI-CQI reporting" reporting quantity, "RI-CQI-subchannel-selection reporting" reporting quantity, the "RI-PMI-CQI reporting" reporting quantity, or the "RI-PMI-CQI-subchannel-selection" reporting quantity, or any combination thereof, when the second UE 115 is transmitting the channel state feedback to indicate a measurement of the CSIS, the second UE 115 may further report the RI 815, the one or more PMIs 820, the one or more CQIs 825, or a combination thereof using different reporting granularities. For example, for the RI 815, the second UE 115 may indicate a wideband, single RI across all (e.g., selected or configured) subchannels. Additionally or alternatively, for the one or more PMIs 820, the second UE 115 may indicate a wideband PMI or individual PMIs per (e.g., selected or configured) subchannel (e.g., such that each PMI corresponds to a separate subchannel, such as a PMI 2 for a subchannel 2, a PMI 3 for a subchannel 3, etc.) or separate PMIs per subband within each (e.g., selected or configured) subchannel. Additionally or alternatively, for the one or more CQIs 825, the second UE 115 may indicate a wideband CQI or individual CQIs per (e.g., selected or configured) subchannel (e.g., such that each CQI corresponds to a separate subchannel, such as a CQI 2 for a subchannel 2, a CQI 3 for a subchannel 3, etc.) or separate CQIs per subband within each (e.g., selected or configured) subchannel. In some examples, the "RI-CQI reporting" and the "RI-PMI-CQI reporting" reporting quantities may be combined with a subchannel-selection (e.g., "RI-CQI-subchannel-selection reporting" reporting quantity and "RI-PMI-CQI-subchannel-selection" reporting quantity), where the corresponding measurements are reported based on a subchannel selection.

FIG. 9 illustrates an example of a CSI report configuration 900 that supports unified CSI framework for sidelink communications in accordance with aspects of the present disclosure. CSI report configuration 900 may implement aspects of or may be implemented by aspects of wireless communications system 100, wireless communications system 200, or both. For example, a first UE 115 (e.g., a source UE 115, a transmitting UE 115, etc.) may trigger a CSI report configuration for a second UE 115 (e.g., destination UE 115, receiving UE 115, etc.), where the second UE 115 transmits a CSI report based on CSI report configuration 900. That is, the CSI report configuration triggered by the first UE 115 may be a non-reciprocal-based CSI acquisition, such that the first UE 115 transmits one or more CSI-RSs to the second UE 115 and the second UE 115 performs a CSI measurement that is included in channel state feedback transmitted from the second UE 115 to the first UE 115. Accordingly, the second UE 115 may use CSI report configuration 900 to transmit the channel state feedback.

In some wireless communications systems, a CSI report may be transmitted via a MAC-CE. That is, a UE 115 that is configured to send the CSI may reserve a resource for a PSSCH and may transmit the CSI in the PSSCH. In the slot of the PSSCH, there may also be a PSCCH resource carrying a first SCI (e.g., SCI-1), and a second SCI (e.g., SCI-2) may be carried in the PSSCH together with the data. The first SCI and the second SCI may jointly carry scheduling information of the data transmitted in the PSSCH. For example, the first SCI may contain or indicate a resource allocation, a format for the second SCI, a modulation and coding scheme (MCS) of the PSSCH, etc. Additionally, the second SCI may contain a resource identifier (ID) (e.g., to indicate from which UE the data is transmitted in the PSSCH) and a destination ID (e.g., to indicate for which UE 115 the data in the PSSCH is intended).

Additionally or alternatively, as described herein, when the second UE 115 is transmitting the channel state feedback, the second UE may use a two-part CSI reporting configuration, where a first part of a CSI report (e.g., CSI-1) is used to determine a payload of a second part of the CSI report (e.g., CSI-2). For example, if a reporting quantity included with a trigger for the CSI reporting includes a subchannel-selection indication (e.g., "subchannel selection" reporting quantity, "RI-PMI-CQI-subchannel-selection" reporting quantity, etc.), the first part of the CSI report may contain a subchannel-selection, an RI (e.g., if common to all subchannels), a number of non-zero coefficients (e.g., if high resolution codebook is supported), or a combination thereof. Additionally or alternatively, if the reporting quantity included with the trigger for the CSI reporting does not include a subchannel-selection indication (e.g., "RI-CQI reporting" reporting quantity, the "RI-PMI-CQI reporting" reporting quantity, etc.), the first part of the CSI report may contain CQI, an RI, a number of non-zero coefficients (e.g., if high resolution supported), or a combination thereof. The second part of the CSI report may contain full PMIs. For example, if the reporting quantity included with the trigger for the CSI reporting includes the subchannel-selection indication, the second part of the CSI report may include PMI on selected subchannels, CQI on selected subchannels, or a combination thereof. Additionally or alternatively, if the reporting quantity included with the trigger for the CSI reporting does not include a subchannel-selection indication, the second part of the CSI report may include a wideband or specific subchannel PMI for all of the subchannels, or specific subband PMIs for each of the subbands of each subchannel.

As shown in the example of FIG. 9, CSI report configuration 900 may include an SCI-1 905 (e.g., a first SCI, a first stage SCI, etc.), an SCI-2 910 (e.g., a second SCI, a second stage SCI, etc.), a data portion 915, and a gap 920. Accordingly, the second UE 115 may transmit the first part of the CSI reporting (CSI-1) via SCI-2 910. In some examples, SCI-2 910 may include an SCI-2 format that carries the information mentioned previously for the first part of the CSI report (e.g., an SCI-2 format indication in SCI-1 905 may be set to this SCI-2 format). Additionally, SCI-1 905 may indicate an offset for a coding rate of the second part of the CSI report. For example, a coding rate of data for the data portion 915 (e.g., if there is data in the data portion 915) to be transmitted in a PSSCH may be represented by R, and the offset for the coding rate of the second part of the CSI report may be represented by beta (p). As such, a scheduled coding rate of the second part of the CSI report may be represented by R*β. The second UE 115 may transmit the second part of the CSI report (CSI-2) in resource(s) of the PSSCH not assigned to SCI-2 910. In some examples, the second UE 115 may transmit the second part of the CSI report multiplexed with data (e.g., sidelink data) in the data portion 915.

FIG. 10 illustrates an example of a process flow 1000 that supports unified CSI framework for sidelink communications in accordance with aspects of the present disclosure. Process flow 1000 may implement aspects of or may be implemented by aspects of the wireless communications system 100, wireless communications system 200, or both. For example, process flow 1000 may include a UE 115-*e* and a UE 115-*f*, which may represent examples of UEs 115 as described with reference to FIGS. 1-9. Additionally, UE 115-*e* and UE 115-*f* may support sidelink communications with each other, where UE 115-*e* (e.g., source UE 115, a transmitting UE 115, etc.) may identify data to be transmitted to UE 115-*f* (e.g., destination UE 115, receiving UE 115, etc.) as part of the sidelink communications.

In the following description of the process flow 1000, the operations between UE 115-*e* and UE 115-*f* may be performed in different orders or at different times. Operations may also be left out of the process flow 1000, or other operations may be added to the process flow 1000. It is to be understood that although UE 115-*e* and UE 115-*f* are shown performing a number of the operations of process flow 1000, any wireless device may perform the operations shown.

At 1005, UE 115-*e* may transmit, to UE 115-*f*, a trigger message triggering a CSI report, a configuration of the CSI report including a first CSI reporting mode of a set of different modes for a CSI procedure. Each of the set of different modes for the CSI procedure may be linked to a CSI-RS resource for channel measurement and for interference measurement. In some examples, UE 115-*e* and UE 115-*f* may identify the configuration of the CSI report (e.g., CSI report configuration) that indicates the first CSI reporting mode. For example, the configuration may be preconfigured at UE 115-*e* and UE 115-*f* or may be previously signaled (e.g., from UE 115-*e* to UE 115-*f*; from a network device to UE 115-*e*, UE 115-*f*, or both; etc.).

At 1010, UE 115-*e* may transmit to or receive from UE 115-*f* a CSI-RS in accordance with the first CSI reporting mode. For example, UE 115-*e* may transmit the CSI-RS to UE 115-*f* based on if the first CSI reporting mode and the corresponding reporting quantity indicate a non-reciprocal-based CSI reporting mode. Additionally or alternatively, UE 115-*e* may receive the CSI-RS from UE 115-*f* based on if the first CSI reporting mode and the corresponding reporting quantity indicate a reciprocal-based CSI reporting mode.

In some examples, the first CSI reporting mode may include a reporting quantity that configures or triggers UE 115-*f* to transmit the CSI-RS. For example, the reporting quantity may be set to antenna switching as described with reference to FIGS. 2 and 6. Accordingly, UE 115-*e* may receive, from UE 115-*f*, the CSI-RS, where a CSI measurement is determined based on a measurement of the CSI-RS. In some implementations, UE 115-*e* may determine a CSI-RS resource for UE 115-*f* to transmit the CSI-RS based on transmitting a second trigger message, transmitting a CSI-RS resource configuration associated with the first CSI reporting mode, or both. Additionally, UE 115-*e* may receive, from UE 115-*f*, a UE capability report indicating a number of transmit antennas at UE 115-*f*, a number of receive antennas at UE 115-*f*, or both, where UE 115-*e* transmits the trigger message or a configuration message that indicates the CSI-RS resource that is selected based on the UE capability report. In some examples, UE 115-*e* may determine that the number of receive antennas at UE 115-*f* is greater than the number of transmit antennas at UE 115-*f*, where the number of receive antennas is greater than the number of transmit antennas by a multiplying factor.

Additionally, UE 115-*e* may determine that the first CSI reporting mode includes a number of symbols corresponding to the multiplying factor, where one or more first CSI-RS ports transmitted on a first symbol of the number of symbols is associated with a first set of antenna ports of UE 115-*f* that is different than a second set of antenna ports of UE 115-*f* used to transmit one or more second CSI-RS ports transmitted on a second symbol of the number of symbols. Additionally or alternatively, the first CSI reporting mode may include a number of resources corresponding to the multiplying factor, each resource of the number of resources being transmitted on a respective symbol of the number of symbols, and where the one or more first CSI-RS ports are transmitted in a first resource of the number of resources and the one or more second CSI-RS ports are transmitted in a second resource of the number of resources. In some examples, the first CSI reporting mode may include a single resource with a number of different symbol locations corresponding to the multiplying factor. Additionally, in some implementations, a gap may be configured between any two symbols of the number of symbols, the gap being based on the UE capability report received from UE 115-*f*.

Additionally or alternatively, the first CSI reporting mode may include a reporting quantity that configures or triggers UE 115-*f* to perform a subchannel selection as described with reference to FIGS. 2 and 7. Accordingly, UE 115-*e* may transmit, to UE 115-*f*, the CSI-RS and may receive, from UE 115-*f*, channel state feedback indicating the CSI measurement based on transmitting the CSI-RS, where the channel state feedback includes at least an indication of a subset of one or more subchannels of a plurality of subchannels. In some examples, UE 115-*e* may receive, from UE 115-*f*, the channel state feedback including the indication of the subset of one or more subchannels based on a signal measurement of each subchannel of the subset of one or more subchannels satisfying a threshold. For example, the signal measurement may include an RSRP measurement, an SINR, an SNR, a spectral efficiency measurement, or a combination thereof. Additionally, the threshold may be configured via control signaling, by a network device, by UE 115-*e*, is predefined, or a combination thereof.

In some examples, UE 115-*e* may transmit, to UE 115-*f*, an indication of a number of subchannels for UE 115-*f* to indicate in the channel state feedback, where the indication of the subset of one or more subchannels is based on the indication of the number of subchannels. For example, the indication of the number of subchannels includes a number of total subchannels to perform the CSI measurement, a number of subchannels to be selected by UE 115-*f*, or both. Additionally, the subset of one or more subchannels may include a selection of consecutive or non-consecutive subchannels of the set of subchannels.

Additionally or alternatively, the first CSI reporting mode may include a reporting quantity that configures or triggers UE 115-*f* to perform a channel quality reporting including at least an RI and a CQI as described with reference to FIGS. 2 and 8. Accordingly, UE 115-*e* may transmit, to UE 115-*f*, the CSI-RS for UE 115-*f* to perform the channel quality reporting and may receive, from UE 115-*f*, channel state feedback indicating the CSI measurement based on transmitting the CSI-RS, where the channel state feedback includes at least an indication of a selection of a subset of one or more RI ports of a set of ports. In some examples, an RI value for the subset of one or more RI ports may be configured by UE 115-*e*, reported by UE 115-*f*, or a combination thereof. Additionally, in some examples, UE 115-*f* may perform the channel quality reporting combined with a subchannel-selection, where the channel state feedback is based on the subchannel selection.

Additionally or alternatively, the first CSI reporting mode may include a reporting quantity that configures or triggers UE 115-*f* to perform a PMI-based channel quality reporting as described with reference to FIGS. 2 and 8. Accordingly, UE 115-*e* may transmit, to UE 115-*f*, the CSI-RS for UE 115-*f* to perform the PMI-based channel quality reporting and may receive, from UE 115-*f*, channel state feedback based on transmitting the CSI-RS, where the channel state feedback includes a PMI-based CSI report. In some examples, the PMI-based CSI report may include an RI, one or more PMIs, one or more CQIs, or a combination thereof for a total number of subchannels or a subset of the number of subchannels.

At 1015, UE 115-*e* may determine a CSI measurement for the reporting quantity based on the CSI-RS. In some examples, UE 115-*e* may receive, from UE 115-*f*, the CSI report including a first part and a second part as described with reference to FIGS. 2 and 9. For example, the first part may include a fixed payload, and the second part may include a variable payload that is determined based on a reporting content in the first part. Additionally, the first part may include at least one of a subchannel selection, an RI, a CQI, a number of non-zero coefficients, or a combination thereof. The second part may include at least one of a PMI for a subset of selected subchannels of a set of subchannels, a CQI for the subset of selected subchannels, a PMI for the set of subchannels, or a combination thereof. Subsequently, UE 115-*e* may determine the CSI measurement based on the first part and the second part of the CSI report. In some examples, the first part may be received via a second stage SCI message (e.g., SCI-2), and the second part may be received via a PSSCH.

FIG. 11 shows a block diagram 1100 of a device 1105 that supports unified CSI framework for sidelink communications in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to unified CSI framework for sidelink communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to unified CSI framework for sidelink communications). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of unified CSI framework for sidelink communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver

1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a first UE in accordance with examples as disclosed herein. For example, the communications manager 1120 may be configured as or otherwise support a means for identifying a CSI report configuration that indicates a first CSI reporting mode of a set of multiple different modes for a CSI procedure. Additionally, the communications manager 1120 may be configured as or otherwise support a means for transmitting, to a second UE, a trigger message triggering a CSI report corresponding the CSI report configuration. The communications manager 1120 may be configured as or otherwise support a means for transmitting to or receiving form the second UE a CSI-RS in accordance with the first CSI reporting mode.

Additionally or alternatively, the communications manager 1120 may support wireless communications at a second UE in accordance with examples as disclosed herein. For example, the communications manager 1120 may be configured as or otherwise support a means for receiving, from a first UE, a trigger message triggering a CSI report. Additionally, the communications manager 1120 may be configured as or otherwise support a means for identifying a CSI report configuration for the triggered CSI report, the CSI report configuration indicating a first CSI reporting mode of a set of multiple different modes for a CSI procedure The communications manager 1120 may be configured as or otherwise support a means for transmitting to or receiving from the first UE a CSI-RS in accordance with the first CSI reporting mode.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for enhanced sidelink communications with an additional device based on CSI measurements. For example, the techniques described herein may support both reciprocal-based CSI acquisition and non-reciprocal-based CSI acquisition, providing flexibility for devices to perform the CSI acquisition for different reporting quantities. As such, the sidelink communications may be based on CSI measurements for different reporting quantities and CSI reporting modes, such that information gained through the CSI measurements may enhance subsequent sidelink communications.

FIG. 12 shows a block diagram 1200 of a device 1205 that supports unified CSI framework for sidelink communications in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to unified CSI framework for sidelink communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to unified CSI framework for sidelink communications). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of unified CSI framework for sidelink communications as described herein. For example, the communications manager 1220 may include a trigger message component 1225, a CSI-RS component 1230, a CSI report configuration component 1235, a CSI report trigger message component 1240, a CSI-RS communication component 1245, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a first UE in accordance with examples as disclosed herein. The CSI report configuration component 1235 may be configured as or otherwise support a means for identifying a CSI report configuration that indicates a first CSI reporting mode of a set of multiple different modes for a CSI procedure. The trigger message component 1225 may be configured as or otherwise support a means for transmitting, to a second UE, a trigger message triggering a CSI report corresponding to the CSI report configuration. The CSI-RS component 1230 may be configured as or otherwise support a means for transmitting to or receiving from the second UE a CSI-RS in accordance with the first CSI reporting mode. The CSI measurement component 1235 may be configured as or otherwise support a means for determining a CSI measurement based on the CSI-RS.

Additionally or alternatively, the communications manager 1220 may support wireless communications at a second UE in accordance with examples as disclosed herein. The CSI report trigger message component 1240 may be configured as or otherwise support a means for receiving, from a first UE, a trigger message triggering a CSI report. The CSI report configuration component 1235 may be configured as or otherwise support a means for identifying a CSI report configuration for the triggered CSI report, the CSI report configuration indicating a first CSI reporting mode of a set of multiple different modes for a CSI procedure. The CSI-RS communication component 1245 may be configured as or otherwise support a means for transmitting to or receiving from the first UE a CSI-RS in accordance with the first CSI reporting mode.

FIG. 13 shows a block diagram 1300 of a communications manager 1320 that supports unified CSI framework for sidelink communications in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of unified CSI framework for sidelink communications as described herein. For example, the communications manager 1320 may include a trigger message component 1325, a CSI-RS component 1330, a CSI report configuration component 1335, a CSI report trigger message component 1340, a CSI-RS communication component 1345, an antenna switching component 1350, a subchannel selection component 1355, a RI-CQI report component 1360, a RI-PMI-CQI component 1365, a two-part CSI report component 1370, an antenna switching quantity component 1375, a subchannel selection reporting component 1380, a RI-CQI reporting component 1385, a RI-PMI-CQI reporting component 1390, or any combination thereof. Each of these components may communicate, directly or indirectly, with one another (e.g., via one or more buses).

The communications manager 1320 may support wireless communications at a first UE in accordance with examples as disclosed herein. The CSI report configuration component 1335 may be configured as or otherwise support a means for identifying a CSI report configuration that indicates a first CSI reporting mode of a set of multiple different modes for a CSI procedure. The trigger message component 1325 may be configured as or otherwise support a means for transmitting, to a second UE, a trigger message triggering a CSI report corresponding to the CSI report configuration. The CSI-RS component 1330 may be configured as or otherwise support a means for transmitting to or receiving from the second UE a CSI-RS in accordance with the first CSI reporting mode.

In some examples, the first CSI reporting mode includes a reporting quantity that configures or triggers the second UE to transmit the CSI-RS, and the antenna switching component 1350 may be configured as or otherwise support a means for receiving, from the second UE, the CSI-RS. Additionally, the antenna switching component 1350 may be configured as or otherwise support a means for measuring CSI based on the received CSI-RS.

In some examples, the reporting quantity is set to antenna switching.

In some examples, the antenna switching component 1350 may be configured as or otherwise support a means for determining a CSI-RS resource for the second UE to transmit the CSI-RS based on transmitting a second trigger message, transmitting a CSI-RS resource configuration associated with the first CSI reporting mode, or both.

In some examples, the antenna switching component 1350 may be configured as or otherwise support a means for receiving, from the second UE, a UE capability report indicating a number of transmit antennas at the second UE, a number of receive antennas at the second UE, or both. In some examples, the antenna switching component 1350 may be configured as or otherwise support a means for transmitting the trigger message or a configuration message that indicates a CSI-RS resource that is selected based on the UE capability report.

In some examples, the antenna switching component 1350 may be configured as or otherwise support a means for determining that the number of receive antennas at the second UE is greater than the number of transmit antennas at the second UE, where the number of receive antennas is greater than the number of transmit antennas by a multiplying factor. In some examples, the antenna switching component 1350 may be configured as or otherwise support a means for determining that a CSI-RS resource associated with the first CSI reporting mode includes a number of symbols corresponding to the multiplying factor, where one or more first CSI-RS ports transmitted on a first symbol of the number of symbols is associated with a first set of antenna ports of the second UE that is different than a second set of antenna ports of the second UE used to transmit one or more second CSI-RS ports transmitted on a second symbol of the number of symbols.

In some examples, the CSI-RS resource includes a number of resources corresponding to the multiplying factor, each resource of the number of resources being transmitted on a respective symbol of the number of symbols, and where the one or more first CSI-RS ports are transmitted in a first resource of the number of resources and the one or more second CSI-RS ports are transmitted in a second resource of the number of resources.

In some examples, the CSI-RS resource includes a single resource with a number of different symbol locations corresponding to the multiplying factor.

In some examples, a gap is configured between any two symbols of the number of symbols, the gap being based on the UE capability report received from the second UE.

In some examples, the first CSI reporting mode includes a reporting quantity that configures or triggers the second UE to perform a subchannel selection, and the subchannel selection component 1355 may be configured as or otherwise support a means for transmitting, to the second UE, the CSI-RS. In some examples, the first CSI reporting mode includes the reporting quantity that configures or triggers the second UE to perform a subchannel selection, and the subchannel selection component 1355 may be configured as or otherwise support a means for receiving, from the second UE, channel state feedback indicating CSI, where the channel state feedback includes at least an indication of a subset of one or more subchannels of a set of multiple subchannels.

In some examples, the subchannel selection component 1355 may be configured as or otherwise support a means for receiving, from the second UE, the channel state feedback including the indication of the subset of one or more subchannels based on a signal measurement of each subchannel of the subset of one or more subchannels satisfying a threshold.

In some examples, the signal measurement includes an RSRP measurement, an SINR, an SNR, a spectral efficiency measurement, or a combination thereof.

In some examples, the threshold is configured via control signaling, by a network device, by the first UE, is predefined, or a combination thereof.

In some examples, the subchannel selection component 1355 may be configured as or otherwise support a means for transmitting, to the second UE, an indication of a number of subchannels for the second UE to indicate in the channel state feedback, where the indication of the subset of one or more subchannels is based on the indication of the number of subchannels.

In some examples, the indication of the number of subchannels includes a number of total subchannels to perform a CSI measurement, a number of subchannels to be selected by the second UE, or both.

In some examples, the subset of one or more subchannels includes a selection of consecutive or non-consecutive subchannels of the set of multiple subchannels.

In some examples, the first CSI reporting mode includes a reporting quantity that configures or triggers the second UE to perform a channel quality reporting including at least a RI and a CQI, and the RI-CQI report component 1360 may be configured as or otherwise support a means for transmitting, to the second UE, the CSI-RS for the second UE to perform CSI reporting. In some examples, the first CSI reporting mode includes the reporting quantity that configures or triggers the second UE to perform a channel quality reporting including at least a RI and a CQI, and the RI-CQI report component 1360 may be configured as or otherwise support a means for receiving, from the second UE, channel state feedback indicating a CSI measurement based on the transmitted CSI-RS, where the channel state feedback includes at least an indication of a selection of a subset of one or more RI ports of a set of multiple ports.

In some examples, a RI value for the subset of one or more RI ports is configured by the first UE, reported by the second UE, or a combination thereof.

In some examples, the first CSI reporting mode includes a reporting quantity that configures or triggers the second UE to perform a PMI-based channel quality reporting, and the RI-PMI-CQI component 1365 may be configured as or otherwise support a means for transmitting, to the second UE, the CSI-RS for the second UE to perform the PMI-based channel quality reporting. In some examples, the first CSI reporting mode includes the reporting quantity that configures or triggers the second UE to perform a PMI-based channel quality reporting, and the RI-PMI-CQI component 1365 may be configured as or otherwise support a means for receiving, from the second UE, channel state feedback based on the transmitted CSI-RS, where the channel state feedback includes a PMI-based CSI report.

In some examples, the PMI-based CSI report includes a RI, one or more PMIs, one or more CQIs, or a combination thereof for a total number of subchannels or a subset of the number of subchannels.

In some examples, each of the set of multiple different modes for the CSI procedure are linked to a CSI-RS resource for channel measurement and for interference measurement.

In some examples, the two-part CSI report component 1370 may be configured as or otherwise support a means for receiving, from the second UE, the CSI report including a first part and a second part, the first part including a fixed payload and the second part including a variable payload that is determined based on a reporting content in the first part, where the first part includes at least one of a subchannel selection, a RI, a CQI, a number of non-zero coefficients, or a combination thereof, and the second part includes at least one of a PMI for a subset of selected subchannels of a set of multiple subchannels, a CQI for the subset of selected subchannels, a PMI for the set of multiple subchannels, or a combination thereof, where a CSI measurement is determined based on the first part and the second part of the CSI report.

US 12,634,091 B2

43

In some examples, the first part is received via a second stage SCI message and the second part is received via a PSSCH.

Additionally or alternatively, the communications manager 1320 may support wireless communications at a second UE in accordance with examples as disclosed herein. The CSI report trigger message component 1340 may be configured as or otherwise support a means for receiving, from a first UE, a trigger message triggering a CSI report. The CSI report configuration component 1335 may be configured as or otherwise support a means for identifying a CSI report configuration for the triggered CSI report, the CSI report configuration indicating a first CSI reporting mode of a set of multiple different modes for a CSI procedure. The CSI-RS communication component 1345 may be configured as or otherwise support a means for transmitting to or receiving from the first UE a CSI-RS in accordance with the first CSI reporting mode.

In some examples, the first CSI reporting mode includes a reporting quantity that configures or triggers the second UE to transmit the CSI-RS, and the antenna switching quantity component 1375 may be configured as or otherwise support a means for transmitting, to the first UE, the CSI-RS.

In some examples, the first CSI reporting mode includes a reporting quantity that configures or triggers the second UE to perform a subchannel selection, and the subchannel selection reporting component 1380 may be configured as or otherwise support a means for receiving, from the first UE, the CSI-RS. In some examples, the first CSI reporting mode includes the reporting quantity that configures or triggers the second UE to perform a subchannel selection, and the subchannel selection reporting component 1380 may be configured as or otherwise support a means for transmitting, to the first UE, channel state feedback indicating a CSI measurement based on receiving the CSI-RS, where the channel state feedback includes at least an indication of a subset of one or more subchannels of a set of multiple subchannels.

In some examples, the first CSI reporting mode includes a reporting quantity that configures or triggers the second UE to perform a channel quality reporting including at least a RI and a CQI, and the RI-CQI reporting component 1385 may be configured as or otherwise support a means for receiving, from the first UE, the CSI-RS for the second UE to perform CSI reporting. In some examples, the first CSI reporting mode includes the reporting quantity that configures or triggers the second UE to perform a channel quality reporting including at least a RI and a CQI, and the RI-CQI reporting component 1385 may be configured as or otherwise support a means for transmitting, to the first UE, channel state feedback indicating a CSI measurement based on the received CSI-RS, where the channel state feedback includes at least an indication of a selection of a subset of one or more RI ports of a set of multiple ports.

In some examples, the first CSI reporting mode includes a reporting quantity that configures or triggers the second UE to transmit the CSI report, and the CSI-RS communication component 1345 may be configured as or otherwise support a means for receiving, from the first UE, the CSI-RS for the second UE to perform CSI reporting for transmitting the CSI report. Additionally, the CSI-RS communication component 1345 may be configured as or otherwise support a means for transmitting, to the first UE, the CSI report based on the received CSI-RS, where the CSI report includes a first part and a second part. For example, the first part may be transmitted via a second-stage SCI message (e.g., SCI-2), and the second part may be transmitted via a PSSCH.

In some examples, the first CSI reporting mode includes a reporting quantity that configures or triggers the second UE to perform a PMI-based channel quality reporting, and the RI-PMI-CQI reporting component 1390 may be configured as or otherwise support a means for receiving, from the first UE, the CSI-RS for the second UE to perform the PMI-based channel quality reporting. In some examples, the first CSI reporting mode includes the reporting quantity that configures or triggers the second UE to perform a PMI-based channel quality reporting, and the RI-PMI-CQI reporting component 1390 may be configured as or otherwise support a means for transmitting, to the first UE, channel state feedback based on the received CSI-RS, where the channel state feedback includes a PMI-based CSI report.

FIG. 14 shows a diagram of a system 1400 including a device 1405 that supports unified CSI framework for sidelink communications in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting unified CSI framework for sidelink communications). For example, the device 1405 or a component of the device 1405 may include a processor 1440 and memory 1430 coupled to the processor 1440, the processor 1440 and memory 1430 configured to perform various functions described herein.

The communications manager 1420 may support wireless communications at a first UE in accordance with examples as disclosed herein. For example, the communications manager 1420 may be configured as or otherwise support a means for identifying a CSI report configuration that indicates a first CSI reporting mode of a set of multiple different modes for a CSI procedure. Additionally, the communications manager 1420 may be configured as or otherwise support a means for transmitting, to a second UE, a trigger message triggering a CSI report corresponding to the CSI report configuration. The communications manager 1420 may be configured as or otherwise support a means for transmitting to or receiving from the second UE a CSI-RS in accordance with the first CSI reporting mode. The communications manager 1420 may be configured as or otherwise support a means for determining a CSI measurement based on the CSI-RS.

Additionally or alternatively, the communications manager 1420 may support wireless communications at a second UE in accordance with examples as disclosed herein. For example, the communications manager 1420 may be configured as or otherwise support a means for receiving, from a first UE, a trigger message triggering a CSI report. Additionally, the communications manager 1420 may be configured as or otherwise support a means for identifying a CSI report configuration for the triggered CSI report, the CSI report configuration indicating a first CSI reporting mode of a set of multiple different modes for a CSI procedure. The communications manager 1420 may be configured as or otherwise support a means for transmitting to or receiving from the first UE a CSI-RS in accordance with the first CSI reporting mode.

By including or configuring the communications manager 1420 in accordance with examples as described herein, the device 1405 may support techniques for enhanced sidelink communications, such as improved sidelink communication reliability, reduced latency, and more efficient utilization of sidelink communication resources. For example, the techniques may enable both reciprocal-based CSI acquisition and non-reciprocal-based CSI acquisition, such that the device 1405 can use CSI from different reporting quantities and different CSI reporting modes to determine parameters, configurations, or both for subsequent sidelink communications. These determined parameters/configurations may support improved reliability, reduced latency, and more efficient utilization of communication resources based on using the CSI to determine those parameters and configurations that result in such enhancements.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of unified CSI framework for sidelink communications as described herein, or the processor 1440 and the memory 1430 may be otherwise configured to perform or support such operations.

Figure 15:
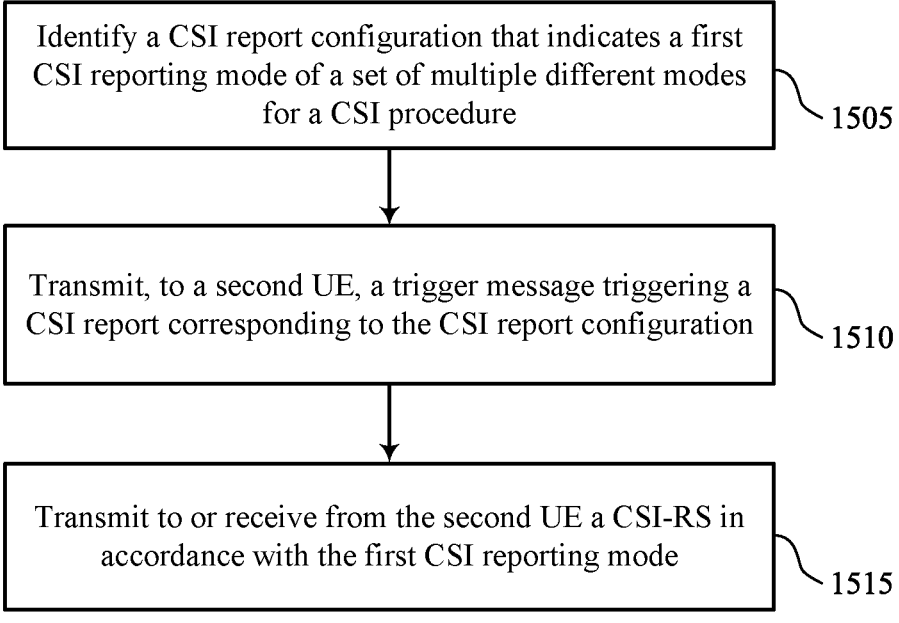

FIG. 15 shows a flowchart illustrating a method 1500 that supports unified CSI framework for sidelink communications in accordance with aspects of the present disclosure. The operations of the method 1500 may be implemented by a UE or its components as described herein. For example, the operations of the method 1500 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1505, the method may include identifying a CSI report configuration that indicates a first CSI reporting mode of a set of multiple different modes for a CSI procedure. The operations of 1505 may be performed in accordance with examples as disclosed herein. In some examples, aspects of the operations of 1505 may be performed by a CSI report configuration component 1335 as described with reference to FIG. 13.

At 1510, the method may include transmitting, to a second UE, a trigger message triggering a CSI report corresponding to the CSI report configuration. The operations of 1510 may be performed in accordance with examples as disclosed herein. In some examples, aspects of the operations of 1510 may be performed by a trigger message component 1325 as described with reference to FIG. 13.

At 1515, the method may include transmitting to or receiving from the second UE a CSI-RS in accordance with the first CSI reporting mode. The operations of 1515 may be performed in accordance with examples as disclosed herein. In some examples, aspects of the operations of 1515 may be performed by a CSI-RS component 1330 as described with reference to FIG. 13.

FIG. 16 shows a flowchart illustrating a method 1600 that supports unified CSI framework for sidelink communications in accordance with aspects of the present disclosure. The operations of the method 1600 may be implemented by a UE or its components as described herein. For example, the operations of the method 1600 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1605, the method may include identifying a CSI report configuration that indicates a first CSI reporting mode of a set of multiple different modes for a CSI procedure. The operations of 1605 may be performed in accordance with examples as disclosed herein. In some examples, aspects of the operations of 1605 may be performed by a CSI report configuration component 1335 as described with reference to FIG. 13.

At 1610, the method may include transmitting, to a second UE, a trigger message triggering a CSI report corresponding to the CSI report configuration. The operations of 1610 may be performed in accordance with examples as disclosed herein. In some examples, aspects of the operations of 1610 may be performed by a trigger message component 1325 as described with reference to FIG. 13.

At 1615, the method may include transmitting to or receiving from the second UE a CSI-RS in accordance with the first CSI reporting mode. The operations of 1615 may be performed in accordance with examples as disclosed herein. In some examples, aspects of the operations of 1615 may be performed by a CSI-RS component 1330 as described with reference to FIG. 13.

At 1620, the method may include receiving, from the second UE, the CSI-RS and measuring CSI based on the received CSI-RS. The operations of 1620 may be performed in accordance with examples as disclosed herein. In some examples, aspects of the operations of 1620 may be performed by an antenna switching component 1350 as described with reference to FIG. 13.

FIG. 17 shows a flowchart illustrating a method 1700 that supports unified CSI framework for sidelink communications in accordance with aspects of the present disclosure. The operations of the method 1700 may be implemented by a UE or its components as described herein. For example, the operations of the method 1700 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1705, the method may include identifying a CSI report configuration that indicates a first CSI reporting mode of a set of multiple different modes for a CSI procedure. The operations of 1705 may be performed in accordance with examples as disclosed herein. In some examples, aspects of the operations of 1705 may be performed by a CSI report configuration component 1335 as described with reference to FIG. 13.

At 1710, the method may include transmitting, to a second UE, a trigger message triggering a CSI report corresponding to the CSI report configuration. The operations of 1710 may be performed in accordance with examples as disclosed herein. In some examples, aspects of the operations of 1710 may be performed by a trigger message component 1325 as described with reference to FIG. 13.

At 1715, the method may include transmitting to or receiving from the second UE a CSI-RS in accordance with the first CSI reporting mode. The operations of 1715 may be performed in accordance with examples as disclosed herein.

In some examples, aspects of the operations of 1715 may be performed by a CSI-RS component 1330 as described with reference to FIG. 13.

At 1720, the method may include transmitting, to the second UE, the CSI-RS. The operations of 1720 may be performed in accordance with examples as disclosed herein. In some examples, aspects of the operations of 1720 may be performed by a subchannel selection component 1355 as described with reference to FIG. 13.

At 1725, the method may include receiving, from the second UE, channel state feedback indicating CSI, where the channel state feedback includes at least an indication of a subset of one or more subchannels of a set of multiple subchannels. The operations of 1725 may be performed in accordance with examples as disclosed herein. In some examples, aspects of the operations of 1725 may be performed by a subchannel selection component 1355 as described with reference to FIG. 13.

FIG. 18 shows a flowchart illustrating a method 1800 that supports unified CSI framework for sidelink communications in accordance with aspects of the present disclosure. The operations of the method 1800 may be implemented by a UE or its components as described herein. For example, the operations of the method 1800 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1805, the method may include identifying a CSI report configuration that indicates a first CSI reporting mode of a set of multiple different modes for a CSI procedure. The operations of 1805 may be performed in accordance with examples as disclosed herein. In some examples, aspects of the operations of 1805 may be performed by a CSI report configuration component 1335 as described with reference to FIG. 13.

At 1810, the method may include transmitting, to a second UE, a trigger message triggering a CSI report corresponding to the CSI report configuration. The operations of 1810 may be performed in accordance with examples as disclosed herein. In some examples, aspects of the operations of 1810 may be performed by a trigger message component 1325 as described with reference to FIG. 13.

At 1815, the method may include transmitting to or receiving from the second UE a CSI-RS in accordance with the first CSI reporting mode. The operations of 1815 may be performed in accordance with examples as disclosed herein. In some examples, aspects of the operations of 1815 may be performed by a CSI-RS component 1330 as described with reference to FIG. 13.

At 1820, the method may include transmitting, to the second UE, the CSI-RS for the second UE to perform CSI reporting. The operations of 1820 may be performed in accordance with examples as disclosed herein. In some examples, aspects of the operations of 1820 may be performed by a RI-CQI report component 1360 as described with reference to FIG. 13.

At 1825, the method may include receiving, from the second UE, channel state feedback indicating the CSI measurement based on the transmitted CSI-RS, where the channel state feedback includes at least an indication of a selection of a subset of one or more RI ports of a set of multiple ports. The operations of 1825 may be performed in accordance with examples as disclosed herein. In some examples, aspects of the operations of 1825 may be performed by a RI-CQI report component 1360 as described with reference to FIG. 13.

FIG. 19 shows a flowchart illustrating a method 1900 that supports unified CSI framework for sidelink communications in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include identifying a CSI report configuration that indicates a first CSI reporting mode of a set of multiple different modes for a CSI procedure. The operations of 1905 may be performed in accordance with examples as disclosed herein. In some examples, aspects of the operations of 1905 may be performed by a CSI report configuration component 1335 as described with reference to FIG. 13.

At 1910, the method may include transmitting, to a second UE, a trigger message triggering a CSI report corresponding to the CSI report configuration. The operations of 1910 may be performed in accordance with examples as disclosed herein. In some examples, aspects of the operations of 1910 may be performed by a trigger message component 1325 as described with reference to FIG. 13.

At 1915, the method may include transmitting to or receiving from the second UE a CSI-RS in accordance with the first CSI reporting mode. The operations of 1915 may be performed in accordance with examples as disclosed herein. In some examples, aspects of the operations of 1915 may be performed by a CSI-RS component 1330 as described with reference to FIG. 13.

At 1920, the method may include transmitting, to the second UE, the CSI-RS for the second UE to perform a PMI-based channel quality reporting. The operations of 1920 may be performed in accordance with examples as disclosed herein. In some examples, aspects of the operations of 1920 may be performed by a RI-PMI-CQI component 1365 as described with reference to FIG. 13.

At 1925, the method may include receiving, from the second UE, channel state feedback based on the transmitted CSI-RS, where the channel state feedback includes a PMI-based CSI report. The operations of 1925 may be performed in accordance with examples as disclosed herein. In some examples, aspects of the operations of 1925 may be performed by a RI-PMI-CQI component 1365 as described with reference to FIG. 13.

Figure 20:
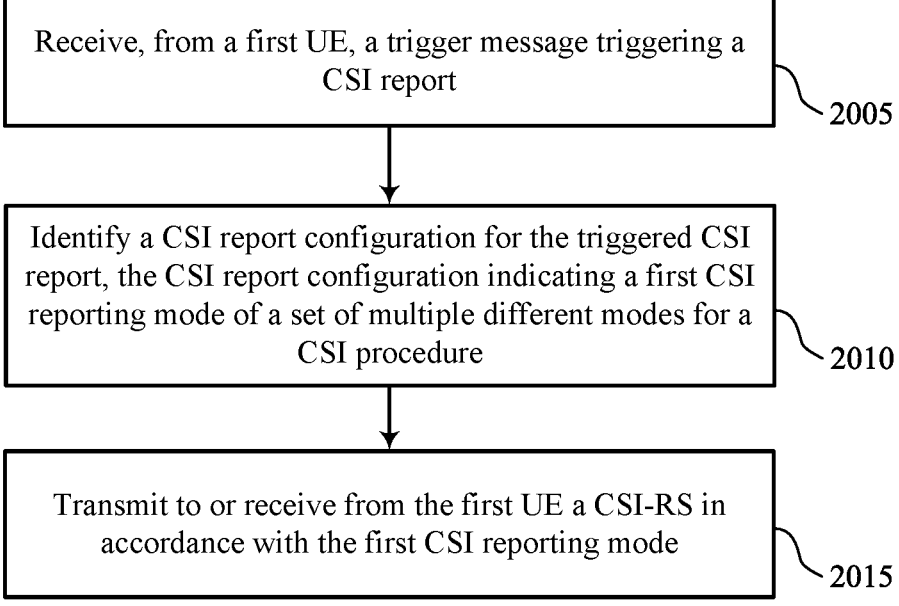

FIG. 20 shows a flowchart illustrating a method 2000 that supports unified CSI framework for sidelink communications in accordance with aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2005, the method may include receiving, from a first UE, a trigger message triggering a CSI report. The operations of 2005 may be performed in accordance with examples as disclosed herein. In some examples, aspects of the operations of 2005 may be performed by a CSI report trigger message component 1340 as described with reference to FIG. 13.

At 2010, the method may include identifying a CSI report configuration for the triggered CSI report, the CSI report configuration indicating a first CSI reporting mode of a set of multiple different modes for a CSI procedure. The operations of 1705 may be performed in accordance with examples as disclosed herein. In some examples, aspects of the operations of 1705 may be performed by a CSI report configuration component 1335 as described with reference to FIG. 13.

At 2015, the method may include transmitting to or receiving from the first UE a CSI-RS in accordance with the first CSI reporting mode. The operations of 2015 may be performed in accordance with examples as disclosed herein. In some examples, aspects of the operations of 2015 may be performed by a CSI-RS communication component 1345 as described with reference to FIG. 13.

The following provides an overview of aspects of the present disclosure:

Aspect 1: A method for wireless communications at a first UE, comprising: identifying a channel state information report configuration that indicates a first channel state information reporting mode of a plurality of different modes for a channel state information procedure; transmitting, to a second UE, a trigger message triggering a channel state information report corresponding to the first channel state information report configuration; and transmitting to or receiving from the second UE a channel state information reference signal in accordance with the first channel state information reporting mode.

Aspect 2: The method of aspect 1, wherein the first channel state information reporting mode comprises a reporting quantity that configures or triggers the second UE to transmit the channel state information reference signal, the method further comprising: receiving, from the second UE, the channel state information reference signal; and measuring channel state information based at least in part on the received channel state information reference signal.

Aspect 3: The method of aspect 2, wherein the reporting quantity is set to antenna switching.

Aspect 4: The method of any of aspects 2 through 3, further comprising: determining a channel state information reference signal resource for the second UE to transmit the channel state information reference signal based on transmitting a second trigger message, transmitting a channel state information reference signal resource configuration associated with the first channel state information reporting mode, or both.

Aspect 5: The method of any of aspects 2 through 4, further comprising: receiving, from the second UE, a UE capability report indicating a number of transmit antennas at the second UE, a number of receive antennas at the second UE, or both; and transmitting the trigger message or a configuration message that indicates a channel state information reference signal resource that is selected based at least in part on the UE capability report.

Aspect 6: The method of aspect 5, further comprising: determining that the number of receive antennas at the second UE is greater than the number of transmit antennas at the second UE, wherein the number of receive antennas is greater than the number of transmit antennas by a multiplying factor; and determining that a channel state information reference signal resource associated with the first channel state information reporting mode comprises a number of symbols corresponding to the multiplying factor, wherein one or more first channel state information reference signal ports transmitted on a first symbol of the number of symbols is associated with a first set of antenna ports of the second UE that is different than a second set of antenna ports of the second UE used to transmit one or more second channel state information reference signal ports transmitted on a second symbol of the number of symbols.

Aspect 7: The method of aspect 6, wherein the channel state information reference signal resource comprises a number of resources corresponding to the multiplying factor, each resource of the number of resources being transmitted on a respective symbol of the number of symbols, and the one or more first channel state information reference signal ports are transmitted in a first resource of the number of resources and the one or more second channel state information reference signal ports are transmitted in a second resource of the number of resources.

Aspect 8: The method of any of aspects 6 through 7, wherein the channel state information reference signal resource comprises a single resource with a number of different symbol locations corresponding to the multiplying factor.

Aspect 9: The method of any of aspects 6 through 8, wherein a gap is configured between any two symbols of the number of symbols, the gap being based on the UE capability report received from the second UE.

Aspect 10: The method of aspect 1, wherein the first channel state information reporting mode comprises a reporting quantity that configures or triggers the second UE to perform a subchannel selection, the method further comprising: transmitting, to the second UE, the channel state information reference signal; and receiving, from the second UE, channel state feedback indicating channel state information, wherein the channel state feedback comprises at least an indication of a subset of one or more subchannels of a plurality of subchannels.

Aspect 11: The method of aspect 10, further comprising: receiving, from the second UE, the channel state feedback comprising the indication of the subset of one or more subchannels based at least in part on a signal measurement of each subchannel of the subset of one or more subchannels satisfying a threshold.

Aspect 12: The method of aspect 11, wherein the signal measurement comprises a reference signal received power measurement, a signal-to-interference-plus-noise ratio, a signal-to-noise ratio, a spectral efficiency measurement, or a combination thereof.

Aspect 13: The method of any of aspects 11 through 12, wherein the threshold is configured via control signaling, by a network device, by the first UE, is predefined, or a combination thereof.

Aspect 14: The method of any of aspects 10 through 13, further comprising: transmitting, to the second UE, an indication of a number of subchannels for the second UE to indicate in the channel state feedback, wherein the indication of the subset of one or more subchannels is based at least in part on the indication of the number of subchannels.

Aspect 15: The method of aspect 14, wherein the indication of the number of subchannels comprises a number of total subchannels to perform a channel state information measurement, a number of subchannels to be selected by the second UE, or both.

Aspect 16: The method of any of aspects 14 through 15, wherein the subset of one or more subchannels comprises a selection of consecutive or non-consecutive subchannels of the plurality of subchannels.

Aspect 17: The method of aspect 1, wherein the first channel state information reporting mode comprises a reporting quantity that configures or triggers the second UE to perform a channel quality reporting comprising at least a rank indicator and a channel quality indicator, the method further comprising: transmitting, to the second UE, the channel state information reference signal for the second UE to perform channel state information reporting; and receiving, from the second UE, channel state feedback indicating a channel state information measurement based at least in part on the transmitted channel state information reference signal, wherein the channel state feedback comprises at least an indication of a selection of a subset of one or more rank indicator ports of a plurality of ports.

Aspect 18: The method of aspect 17, wherein a rank indicator value for the subset of one or more rank indicator ports is configured by the first UE, reported by the second UE, or a combination thereof.

Aspect 19: The method of aspect 1, wherein the first channel state information reporting mode comprises a reporting quantity that configures or triggers the second UE to perform a precoding matrix indicator-based channel quality reporting, the method further comprising: transmitting, to the second UE, the channel state information reference signal for the second UE to perform the precoding matrix indicator-based channel quality reporting; and receiving, from the second UE, channel state feedback based at least in part on the transmitted channel state information reference signal, wherein the channel state feedback comprises a precoding matrix indicator-based channel state information report.

Aspect 20: The method of aspect 19, wherein the precoding matrix indicator-based channel state information report comprises a rank indicator, one or more precoding matrix indicators, one or more channel quality indicators, or a combination thereof for a total number of subchannels or a subset of the number of subchannels.

Aspect 21: The method of any of aspects 1 through 20, wherein each of the plurality of different modes for the channel state information procedure are linked to a channel state information reference signal resource for channel measurement and for interference measurement.

Aspect 22: The method of any of aspects 1 through 21, further comprising: receiving, from the second UE, the channel state information report comprising a first part and a second part, the first part comprising a fixed payload and the second part comprising a variable payload that is determined based on a reporting content in the first part, wherein the first part comprises at least one of a subchannel selection, a rank indicator, a channel quality indicator, a number of non-zero coefficients, or a combination thereof, and the second part comprises at least one of a precoding matrix indicator for a subset of selected subchannels of a plurality of subchannels, a channel quality indicator for the subset of selected subchannels, a precoding matrix indicator for the plurality of subchannels, or a combination thereof, wherein the channel state information measurement is determined based at least in part on the first part and the second part of the channel state information report.

Aspect 23: The method of aspect 22, wherein the first part is received via a second stage sidelink control information message and the second part is received via a physical sidelink shared channel.

Aspect 24: A method for wireless communications at a second UE, comprising: receiving, from a first UE, a trigger message triggering a channel state information report; identifying a channel state information report configuration for the triggered channel state information report, the channel state information report configuration indicating a first channel state information reporting mode of a plurality of different modes for a channel state information procedure; and transmitting to or receiving from the second UE a channel state information reference signal in accordance with the first channel state information reporting mode.

Aspect 25: The method of aspect 24, wherein the first channel state information reporting mode comprises a reporting quantity that configures or triggers the second UE to transmit the channel state information reference signal, the method further comprising: transmitting, to the first UE, the channel state information reference signal.

Aspect 26: The method of aspect 24, wherein the first channel state information reporting mode comprises a reporting quantity that configures or triggers the second UE to perform a subchannel selection, the method further comprising: receiving, from the first UE, the channel state information reference signal; and transmitting, to the first UE, channel state feedback indicating channel state information, wherein the channel state feedback comprises at least an indication of a subset of one or more subchannels of a plurality of subchannels.

Aspect 27: The method of aspect 24, wherein the first channel state information reporting mode comprises a reporting quantity that configures or triggers the second UE to perform a channel quality reporting comprising at least a rank indicator and a channel quality indicator, the method further comprising: receiving, from the first UE, the channel state information reference signal for the second UE to perform channel state information reporting; and transmitting, to the first UE, channel state feedback indicating a channel state information measurement based at least in part on the received channel state information reference signal, wherein the channel state feedback comprises at least an indication of a selection of a subset of one or more rank indicator ports of a plurality of ports.

Aspect 28: The method of aspect 24, wherein the first channel state information reporting mode comprises a reporting quantity that configures or triggers the second UE to perform a precoding matrix indicator-based channel quality reporting, the method further comprising: receiving, from the first UE, the channel state information reference signal for the second UE to perform the precoding matrix indicator-based channel quality reporting; and transmitting, to the first UE, channel state feedback based at least in part on the received channel state information reference signal, wherein the channel state feedback comprises a precoding matrix indicator-based channel state information report.

Aspect 29: The method of any of aspects 24 to 28, wherein the first channel state information reporting mode comprises a reporting quantity that configures or triggers the second UE to transmit the channel state information report, the method further comprising: receiving, from the first UE, the channel state information reference signal for the second UE to perform channel state information reporting for transmitting the channel state information report; and transmitting, to the first UE, the channel state information report based at least in part on the received channel state information reference signal, wherein the channel state information report comprises a first part and a second part, the first part transmitted via a second-stage sidelink control information message and the second part transmitted via a physical sidelink shared channel.

Aspect 30: An apparatus for wireless communications at a first UE, comprising a processor; memory coupled with the processor; and instructions stored in the memory and executable by the processor to cause the apparatus to perform a method of any of aspects 1 through 23.

Aspect 31: An apparatus for wireless communications at a first UE, comprising at least one means for performing a method of any of aspects 1 through 23.

Aspect 32: A non-transitory computer-readable medium storing code for wireless communications at a first UE, the code comprising instructions executable by a processor to perform a method of any of aspects 1 through 23.

Aspect 33: An apparatus for wireless communications at a second UE, comprising a processor; memory coupled with the processor; and instructions stored in the memory and executable by the processor to cause the apparatus to perform a method of any of aspects 24 through 28.

Aspect 34: An apparatus for wireless communications at a second UE, comprising at least one means for performing a method of any of aspects 24 through 28.

Aspect 35: A non-transitory computer-readable medium storing code for wireless communications at a second UE, the code comprising instructions executable by a processor to perform a method of any of aspects 24 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:

a processor;

memory coupled with the processor; and instructions stored in the memory and executable by the processor to cause the apparatus to:

identify a channel state information report configuration that indicates a first channel state information reporting mode of a plurality of different modes for a channel state information procedure;

transmit, to a second UE, a trigger message triggering a channel state information report corresponding to the channel state information report configuration; and transmit to or receive from the second UE a channel state information reference signal in accordance with the first channel state information reporting mode;

wherein the first channel state information reporting mode comprises a reporting quantity that configures or triggers the second UE to transmit the channel state information reference signal, and the instructions are further executable by the processor to cause the apparatus to:

receive, from the second UE, the channel state information reference signal; and measure channel state information based at least in part on the received channel state information reference signal.

2. The apparatus of claim 1, wherein the reporting quantity is set to antenna switching.

3. The apparatus of claim 1, wherein the instructions are further executable by the processor to cause the apparatus to:

determine a channel state information reference signal resource for the second UE to transmit the channel state information reference signal based on transmitting a second trigger message, transmitting a channel state information reference signal resource configuration associated with the first channel state information reporting mode, or both.

4. The apparatus of claim 1, wherein the instructions are further executable by the processor to cause the apparatus to:

receive, from the second UE, a UE capability report indicating a number of transmit antennas at the second UE, a number of receive antennas at the second UE, or both; and transmit the trigger message or a configuration message that indicates a channel state information reference signal resource that is selected based at least in part on the UE capability report.

5. The apparatus of claim 4, wherein the instructions are further executable by the processor to cause the apparatus to:

determine that the number of receive antennas at the second UE is greater than the number of transmit antennas at the second UE, wherein the number of receive antennas is greater than the number of transmit antennas by a multiplying factor; and determine that a channel state information reference signal resource associated with the first channel state information reporting mode comprises a number of symbols corresponding to the multiplying factor, wherein one or more first channel state information reference signal ports transmitted on a first symbol of the number of symbols is associated with a first set of antenna ports of the second UE that is different than a second set of antenna ports of the second UE used to transmit one or more second channel state information reference signal ports transmitted on a second symbol of the number of symbols.

6. The apparatus of claim 5, wherein:

the channel state information reference signal resource comprises a number of resources corresponding to the multiplying factor, each resource of the number of resources being transmitted on a respective symbol of the number of symbols, and the one or more first channel state information reference signal ports are transmitted in a first resource of the number of resources and the one or more second channel state information reference signal ports are transmitted in a second resource of the number of resources.

7. The apparatus of claim 5, wherein the channel state information reference signal resource comprises a single resource with a number of different symbol locations corresponding to the multiplying factor.

8. The apparatus of claim 5, wherein a gap is configured between any two symbols of the number of symbols, the gap being based on the UE capability report received from the second UE.

9. The apparatus of claim 1, wherein the first channel state information reporting mode comprises a reporting quantity that configures or triggers the second UE to perform a subchannel selection, and the instructions are further executable by the processor to cause the apparatus to:

transmit, to the second UE, the channel state information reference signal; and receive, from the second UE, channel state feedback indicating channel state information, wherein the channel state feedback comprises at least an indication of a subset of one or more subchannels of a plurality of subchannels.

10. The apparatus of claim 9, wherein the instructions are further executable by the processor to cause the apparatus to:

receive, from the second UE, the channel state feedback comprising the indication of the subset of one or more subchannels based at least in part on a signal measurement of each subchannel of the subset of one or more subchannels satisfying a threshold.

11. The apparatus of claim 10, wherein the signal measurement comprises a reference signal received power measurement, a signal-to-interference-plus-noise ratio, a signal-to-noise ratio, a spectral efficiency measurement, or a combination thereof.

12. The apparatus of claim 10, wherein the threshold is configured via control signaling, by a network device, by the first UE, is predefined, or a combination thereof.

13. The apparatus of claim 9, wherein the instructions are further executable by the processor to cause the apparatus to:

transmit, to the second UE, an indication of a number of subchannels for the second UE to indicate in the channel state feedback, wherein the indication of the subset of one or more subchannels is based at least in part on the indication of the number of subchannels.

14. The apparatus of claim 13, wherein the indication of the number of subchannels comprises a number of total subchannels to perform a channel state information measurement, a number of subchannels to be selected by the second UE, or both.

15. The apparatus of claim 13, wherein the subset of one or more subchannels comprises a selection of consecutive or non-consecutive subchannels of the plurality of subchannels.

16. The apparatus of claim 1, wherein the first channel state information reporting mode comprises a reporting quantity that configures or triggers the second UE to perform a channel quality reporting comprising at least a rank indicator and a channel quality indicator, and the instructions are further executable by the processor to cause the apparatus to:

transmit, to the second UE, the channel state information reference signal for the second UE to perform channel state information reporting; and receive, from the second UE, channel state feedback indicating a channel state information measurement based at least in part on the transmitted channel state information reference signal, wherein the channel state feedback comprises at least an indication of a selection of a subset of one or more rank indicator ports of a plurality of ports.

17. The apparatus of claim 16, wherein a rank indicator value for the subset of one or more rank indicator ports is configured by the first UE, reported by the second UE, or a combination thereof.

18. The apparatus of claim 1, wherein the first channel state information reporting mode comprises a reporting quantity that configures or triggers the second UE to perform a precoding matrix indicator-based channel quality reporting, and the instructions are further executable by the processor to cause the apparatus to:

transmit, to the second UE, the channel state information reference signal for the second UE to perform the precoding matrix indicator-based channel quality reporting; and receive, from the second UE, channel state feedback based at least in part on the transmitted channel state information reference signal, wherein the channel state feedback comprises a precoding matrix indicator-based channel state information report.

19. The apparatus of claim 18, wherein the precoding matrix indicator-based channel state information report comprises a rank indicator, one or more precoding matrix indicators, one or more channel quality indicators, or a combination thereof for a total number of subchannels or a subset of the total number of subchannels.

20. The apparatus of claim 1, wherein each of the plurality of different modes for the channel state information procedure are linked to a channel state information reference signal resource for channel measurement and for interference measurement.

21. The apparatus of claim 1, wherein the instructions are further executable by the processor to cause the apparatus to:

receive, from the second UE, a channel state information report comprising a first part and a second part, the first part comprising a fixed payload and the second part comprising a variable payload that is determined based on a reporting content in the first part, wherein the first part comprises at least one of a subchannel selection, a rank indicator, a channel quality indicator, a number of non-zero coefficients, or a combination thereof; and the second part comprises at least one of a precoding matrix indicator for a subset of selected subchannels of a plurality of subchannels, a channel quality indicator for the subset of selected subchannels, a precoding matrix indicator for the plurality of subchannels, or a combination thereof, wherein a channel state information measurement is determined based at least in part on the first part and the second part of the channel state information report.

22. The apparatus of claim 21, wherein the first part is received via a second stage sidelink control information message and the second part is received via a physical sidelink shared channel.

23. An apparatus for wireless communications at a second user equipment (UE), comprising:
a processor;
memory coupled with the processor; and
instructions stored in the memory and executable by the processor to cause the apparatus to:
    receive, from a first UE, a trigger message triggering a channel state information report;
    identify a channel state information report configuration for the triggered channel state information report, the channel state information report configuration indicating a first channel state information reporting mode of a plurality of different modes for a channel state information procedure; and
    transmit to or receive from the first UE a channel state information reference signal in accordance with the first channel state information reporting mode;
    wherein the first channel state information reporting mode comprises a reporting quantity that configures or triggers the second UE to transmit the channel state information reference signal, and the instructions are further executable by the processor to cause the apparatus to:
        transmit, to the first UE, the channel state information reference signal.

24. The apparatus of claim 23, wherein the first channel state information reporting mode comprises a reporting quantity that configures or triggers the second UE to perform a subchannel selection, and the instructions are further executable by the processor to cause the apparatus to:
    receive, from the first UE, the channel state information reference signal; and
    transmit, to the first UE, channel state feedback indicating channel state information, wherein the channel state feedback comprises at least an indication of a subset of one or more subchannels of a plurality of subchannels.

25. The apparatus of claim 23, wherein the first channel state information reporting mode comprises a reporting quantity that configures or triggers the second UE to transmit a channel state information report, and the instructions are further executable by the processor to cause the apparatus to:
    receive, from the first UE, the channel state information reference signal for the second UE to perform channel state information reporting for transmitting the channel state information report; and transmit, to the first UE, the channel state information report based at least in part on the received channel state information reference signal, wherein the channel state information report comprises a first part and a second part, the first part transmitted via a second-stage sidelink control information message and the second part transmitted via a physical sidelink shared channel.

26. The apparatus of claim 23, wherein the first channel state information reporting mode comprises a reporting quantity that configures or triggers the second UE to perform a precoding matrix indicator-based channel quality reporting, and the instructions are further executable by the processor to cause the apparatus to:
    receive, from the first UE, the channel state information reference signal for the second UE to perform the precoding matrix indicator-based channel quality reporting; and
    transmit, to the first UE, channel state feedback based at least in part on the received channel state information reference signal, wherein the channel state feedback comprises a precoding matrix indicator-based channel state information report.

27. A method for wireless communications at a first user equipment (UE), comprising:
identifying a channel state information report configuration that indicates a first channel state information reporting mode of a plurality of different modes for a channel state information procedure;
transmitting, to a second UE, a trigger message triggering a channel state information report corresponding to the channel state information report configuration;
transmitting to or receiving from the second UE a channel state information reference signal in accordance with the first channel state information reporting mode;
wherein the first channel state information reporting mode comprises a reporting quantity that configures or triggers the second UE to transmit the channel state information reference signal, and further comprising:
    receiving, from the second UE, the channel state information reference signal; and
    measuring channel state information based at least in part on the received channel state information reference signal.

28. A method for wireless communications at a second user equipment (UE), comprising:
receiving, from a first UE, a trigger message triggering a channel state information report;
identifying a channel state information report configuration for the triggered channel state information report, the channel state information report configuration indicating a first channel state information reporting mode of a plurality of different modes for a channel state information procedure; and
transmitting to or receiving from the first UE a channel state information reference signal in accordance with the first channel state information reporting mode;
wherein the first channel state information reporting mode comprises a reporting quantity that configures or triggers the second UE to transmit the channel state information reference signal, and further comprising:
    transmitting, to the first UE, the channel state information reference signal.

* * * * *